United States Patent
Jaradeh et al.

(10) Patent No.: US 11,545,007 B2
(45) Date of Patent: Jan. 3, 2023

(54) METHOD, SYSTEM, AND DEVICE FOR SELECTING A WINNER OF A RAFFLE BASED ON CONTENT FROM RAFFLE TICKETS

(71) Applicants: Rim Jaradeh, Westmount (CA); Bacel Jaradeh, Westmount (CA)

(72) Inventors: Rim Jaradeh, Westmount (CA); Bacel Jaradeh, Westmount (CA)

(73) Assignee: Rim Jaradeh, Westmount (CA)

( * ) Notice: Subject to any disclaimer, the term of this patent is extended or adjusted under 35 U.S.C. 154(b) by 0 days.

(21) Appl. No.: 17/260,056

(22) PCT Filed: Jul. 11, 2019

(86) PCT No.: PCT/CA2019/000106
§ 371 (c)(1),
(2) Date: Jan. 13, 2021

(87) PCT Pub. No.: WO2020/010432
PCT Pub. Date: Jan. 16, 2020

(65) Prior Publication Data
US 2021/0248863 A1    Aug. 12, 2021

(30) Foreign Application Priority Data
Jul. 13, 2018   (CA) ................ CA 3011477

(51) Int. Cl.
*G07F 17/32* (2006.01)
*G06F 17/11* (2006.01)
*H04L 9/08* (2006.01)

(52) U.S. Cl.
CPC ........... *G07F 17/329* (2013.01); *G06F 17/11* (2013.01); *G07F 17/3225* (2013.01); *G07F 17/3241* (2013.01); *H04L 9/0825* (2013.01)

(58) Field of Classification Search
CPC .... G07F 17/329; G07F 17/11; G07F 17/3225; G07F 17/3241; H04L 9/0825
See application file for complete search history.

(56) References Cited

U.S. PATENT DOCUMENTS

| | | | |
|---|---|---|---|
| 8,038,519 B1 * | 10/2011 | Luciano, Jr. | .......... G07F 17/326 463/16 |
| 2003/0125100 A1 * | 7/2003 | Cannon | ................ G07F 17/32 463/16 |

(Continued)

FOREIGN PATENT DOCUMENTS

| AU | 2013234356 A1 | 10/2013 |
|---|---|---|
| CA | 2515592 A1 | 9/2004 |

OTHER PUBLICATIONS

Canadian Intellectual Property Office, International Search Report for International Application No. PCT/CA2019/000106, dated Oct. 11, 2019.

(Continued)

*Primary Examiner* — Werner G Garner
(74) *Attorney, Agent, or Firm* — Bradley Arant Boult Cummings; Timothy L. Capria

(57) ABSTRACT

A method, system, and device for securely and deterministically selecting a winner for a raffle taking into account content from the raffle tickets of the raffle. Each raffle ticket comprises entry data for obtaining an entry number such that the entry data is strongly encrypted by the client computer for communication over the computer network to the server computer. Decrypting, at the server computer, the entry data. Obtaining a first output related to the raffle by computing a first deterministic mathematical function taking a first plurality of inputs, wherein the first plurality of inputs comprise the entry numbers. Selecting a winning raffle ticket by obtaining a second output related to the raffle by computing a second deterministic mathematical mapping function tak- (Continued)

ing as a second input the first output of the first mathematical function, wherein the second output corresponds to the winning raffle ticket.

46 Claims, 4 Drawing Sheets

(56) References Cited

U.S. PATENT DOCUMENTS

| | | | |
|---|---|---|---|
| 2008/0073852 A1* | 3/2008 | Cutchin | A63F 3/0665 |
| | | | 273/431 |
| 2008/0248865 A1* | 10/2008 | Tedesco | G07F 17/32 |
| | | | 463/25 |
| 2014/0210704 A1* | 7/2014 | Chou | G06K 9/00389 |
| | | | 345/156 |
| 2014/0370958 A1 | 12/2014 | Lutnick | |
| 2015/0302482 A1* | 10/2015 | Vagner | G06Q 30/0635 |
| | | | 705/14.66 |
| 2016/0240037 A1 | 8/2016 | Robbins et al. | |
| 2016/0339734 A1* | 11/2016 | Lavoie | A63F 3/0665 |
| 2018/0012453 A1 | 1/2018 | Anderson | |

OTHER PUBLICATIONS

Canadian Intellectual Property Office, Written Opinion for International Application No. PCT/CA2019/000106, dated Oct. 11, 2019.

\* cited by examiner

METHOD, SYSTEM, AND DEVICE FOR SELECTING A WINNER OF A RAFFLE BASED ON CONTENT FROM RAFFLE TICKETS

TECHNICAL FIELD

The present invention relates to raffle systems and, more particularly, to a secure and deterministic raffle system for securely and deterministically selecting a winner of a raffle.

BACKGROUND

Traditional raffle systems use mechanical devices such as a spinning wheel or tombola to select the winner of the raffle. Other traditional raffle systems use a computer's random number generator to select the winner of the raffle. Both of these traditional raffle systems have disadvantages, particularly in the context of online raffles held on the Internet.

The present invention aims at providing an improved solution for a raffle system.

SUMMARY

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A first aspect of the invention is directed to a computer readable memory having recorded thereon statements and instructions for execution by a server computer for securely and deterministically selecting a winner for a raffle from a plurality of received raffle tickets taking into account selected content from the received raffle tickets. The statements and instructions comprise code means for receiving the plurality of raffle tickets at the server computer through a computer network from at least one remote client computer, wherein each raffle ticket from the plurality of raffle tickets comprises entry data for obtaining an entry number such that the entry data of at least one of said raffle tickets is selected under control exerted only at the remote client computer and is strongly encrypted by the client computer for communication over the computer network to the server computer. The statements and instructions comprise code means for storing, from the server computer, the plurality of raffle tickets on a storage module of the server computer. The statements and instructions comprise code means for decrypting, at the server computer, the entry data. The statements and instructions further comprise code means for obtaining a first output related to the raffle by computing a first deterministic mathematical function taking a first plurality of inputs, wherein the first plurality of inputs comprise the entry numbers. The statements and instructions comprise code means for selecting a winning raffle ticket for the raffle by obtaining a second output related to the raffle by computing a second deterministic mathematical mapping function taking as a second input the first output of the first mathematical function, wherein the second output corresponds to the winning raffle ticket of the plurality of raffle tickets.

Optionally, the computer readable memory may further comprise code means for specifying a sequential ordering of the plurality of raffle tickets. As an option, the second deterministic mathematical mapping function may be n=(absolute_value(O) modulo N)+1, wherein n is the second output of the second deterministic mathematical mapping function, wherein O is the first output of the first deterministic mathematical function, wherein N is the number of raffle tickets received, and wherein the winning raffle ticket is an $n^{th}$ raffle ticket in the sequential ordering of the plurality of raffle tickets.

Optionally, the computer readable memory may further comprise code means for publicly disclosing the first deterministic mathematical function and the second deterministic mathematical mapping function before all the raffle tickets have been received. As another option, the computer readable memory may comprise code means for publicly disclosing an encrypted file containing the first deterministic mathematical function and the second deterministic mathematical mapping function before all the raffle tickets have been received and publicly disclosing a key for decrypting the encrypted file after selecting the winning raffle ticket.

Optionally, the computer readable memory may further comprise code means for displaying on a computer monitor the winning raffle ticket. Optionally, the computer readable memory may further comprise code means for displaying on a computer monitor the entry data or the entry numbers of the plurality of raffle tickets after selection of the winning raffle ticket.

Optionally, the first deterministic mathematical function may be addition, subtraction, or any combination thereof.

Optionally, the entry data may be received through a user interface of the client computer. As an alternative option, the computer readable memory may further comprise code means to randomly generate the entry data at the client computer, wherein the entry data are displayed at the client computer before all the raffle tickets have been received.

Optionally, the plurality of raffle tickets stored on the storage module of the server computer may comprise the entry data. and wherein the entry data may be strongly encrypted. As another option, the storage module of the server computer may be a strongly encrypted storage module.

Optionally, the computer readable memory may further comprise code means for verifying the winning raffle ticket after selection of the winning raffle ticket. As a further option. the code means for verifying the winning raffle ticket may comprise code means for sending the entry data or the entry numbers through the computer network for display on the at least one remote client computer.

Optionally, the computer readable memory may further comprise code means for selecting the first mathematical function from a set of mathematical functions based on a time of day.

Optionally, the first plurality of inputs may further comprise a number that is publicly disclosed before all the raffle tickets have been received. Optionally, the first plurality of inputs may further comprise a number selected based on a time of day or a property of the raffle tickets, wherein the manner for determining the number is disclosed before all the raffle tickets have been received.

Optionally, a subset of the plurality of raffle tickets may be associated with a user and the entry data of each of the subset of the plurality of raffle tickets may be the same.

Optionally, the entry data of each raffle ticket may be the entry number of each said raffle ticket. As an alternative option, the entry data of each raffle ticket may be a string of characters, and the entry number of each raffle ticket may be the length of each said string of characters.

Optionally, the entry number may be obtained from the entry data at the server computer. As an alternative option, the entry number may be obtained from the entry data at the remote client computers.

Optionally, the entry data of at least one of the raffle tickets may be selected under control exerted only at the server computer, and the entry data or the entry number obtained from said entry data may be sent through the computer network for display at the at least one remote client computer before all the raffle tickets have been received.

A second aspect of the invention is directed to a system for securely and deterministically selecting a winner for a raffle from a plurality of received raffle tickets taking into account selected content from the received raffle tickets. The system comprises a server computer and a plurality of remote client computers, connected through a computer network to the server, wherein each of the plurality of remote client computers comprises a network interface module and a processor module. The processor module of each of the plurality of remote client computers obtains entry data under control exerted only at the remote client computer, wherein the entry data is for obtaining an entry number; and sends at least one raffle ticket comprising the entry data, wherein the entry data are strongly encrypted thereat for communication over the computer network towards the server computer by the network interface module. The server computer comprises a storage module, a network interface module and a processor module. The processor module of the server computer receives the plurality of raffle tickets through the network interface; stores the plurality of raffle tickets on the storage module of the server computer; and decrypts the entry data for each of the plurality of raffle tickets. The processor module of the server computer further obtains a first output related to the raffle by computing a first deterministic mathematical function taking a first plurality of inputs, wherein the first plurality of inputs comprise the entry numbers; and selects a winning raffle ticket for the raffle by obtaining a second output related to the raffle by computing a second deterministic mathematical mapping function taking as a second input the first output of the first mathematical function, wherein the second output corresponds to the winning raffle ticket of the plurality of raffle tickets.

Optionally, the processor module of the server computer may further specify a sequential ordering of the plurality of raffle tickets. Optionally, the second deterministic mathematical mapping function may be n=(absolute_value(O) modulo N)+1, wherein n is the second output of the second deterministic mathematical mapping function, wherein O is the first output of the first deterministic mathematical function, wherein N is the number of raffle tickets received, and wherein the winning raffle ticket may be an $n^{th}$ raffle ticket in the sequential ordering of the plurality of raffle tickets.

Optionally, the plurality of remote client computers may further comprise a user interface module for obtaining the entry data. As an alternative option, the processor modules of the plurality of remote client computers may further randomly generates the entry data, and the entry data may be displayed at the plurality of remote client computers before all the raffle tickets have been received.

Optionally, the plurality of raffle tickets stored on the storage module of the server computer may comprise the entry data, and wherein the entry data may be strongly encrypted. Optionally, the storage module of the server computer may be a strongly encrypted storage module.

Optionally, the processor module of the server computer may further send the entry data or entry numbers through the network interface for display on at least one of the plurality of remote client computers for the purpose of verifying the winning raffle ticket.

Optionally, the entry data of each raffle ticket may be the entry number of each said raffle ticket. As an alternative option, the entry data of each raffle ticket may be a string of characters, and wherein the entry number of each raffle ticket may be the length of each said string of characters.

Optionally, the processor module of the server computer may further obtain the entry number from the entry data. Optionally, the processor modules of the plurality of remote client computers further obtain the entry number from the entry data.

Optionally, the server computer and the plurality of remote client computers may comprise an encryption processor.

Optionally, the server computer may further be for obtaining the entry data of at least one of the raffle tickets under control exerted only at the server computer, and wherein the entry data or the entry number obtained from said entry data may be sent through the computer network for display at at least one of the plurality of remote client computers before all the raffle tickets have been received.

A third aspect of the invention is directed to a method for securely and deterministically selecting a winner for a raffle from a plurality of received raffle tickets taking into account selected content from the received raffle tickets. The method comprises receiving at least one of the plurality of raffle tickets at a server computer through a computer network from at least one remote client computer, wherein each raffle ticket from the plurality of raffle tickets comprises entry data for obtaining an entry number such that the entry data of at least one of said raffle tickets is selected under control exerted only at the remote client computer and is strongly encrypted by the client computer for communication over the computer network to the server computer. The method comprises storing, from the server computer, the plurality of raffle tickets on a storage module of the server computer. The method comprises decrypting, at the server computer, the entry data. The method comprises obtaining a first output related to the raffle by computing a first deterministic mathematical function taking a first plurality of inputs, wherein the first plurality of inputs comprise the entry numbers. The method comprises selecting a winning raffle ticket for the raffle by obtaining a second output related to the raffle by computing a second deterministic mathematical mapping function taking as a second input the first output of the first mathematical function, wherein the second output corresponds to the winning raffle ticket of the plurality of raffle tickets.

Optionally, the method may further comprise specifying a sequential ordering of the plurality of raffle tickets. Optionally, the second deterministic mathematical mapping function is n=(absolute_value(O) modulo N)+1. wherein n is the second output of the second deterministic mathematical mapping function, wherein O is the first output of the first deterministic mathematical function, wherein N is the number of raffle tickets received, and wherein the winning raffle ticket is an $n^{th}$ raffle ticket in the sequential ordering of the plurality of raffle tickets.

Optionally, the method may further comprise verifying the winning raffle ticket after selection of the winning raffle ticket. Optionally, verifying the winning raffle ticket may comprise sending the entry data or the entry numbers through the computer network for display on the at least one remote client computer.

Optionally, the method may further comprise decrypting, at the server computer, the entry data prior to storing the plurality of raffle tickets on a storage module of the server computer. Optionally, the method may further comprise strongly encrypting, at the server computer, the entry data after decrypting the entry data and prior to storing the plurality of raffle tickets on a storage module of the server computer.

Optionally, the method may further comprise obtaining the entry data of at least one of the raffle tickets under control exerted only at the server computer, wherein the entry data or the entry number obtained from said entry data may be sent through the computer network for display at the at least one remote client computer before all the raffle tickets have been received.

A fourth aspect of the invention is directed to a dedicated computer for securely and deterministically selecting a winner for a raffle from a plurality of raffle tickets taking into account selected content from the received raffle tickets. The dedicated computer comprises at least one input module for receiving entry data for obtaining an entry number for each of a plurality of raffle tickets. The dedicated computer comprises an encrypted storage module for securely storing the raffle tickets. The dedicated computer further comprises a processor module for obtaining a first output related to the raffle by computing a first deterministic mathematical function taking a first plurality of inputs, wherein the first plurality of inputs comprise the entry numbers. The processor module of the dedicated computer is further for selecting a winning raffle ticket for the raffle by obtaining a second output related to the raffle by computing a second deterministic mathematical mapping function taking as a second input the first output of the first mathematical function, wherein the second output corresponds to the winning raffle ticket of the plurality of raffle tickets. The dedicated computer comprises a display module for displaying the winning raffle ticket; displaying the first deterministic mathematical function and the second deterministic mathematical function; and displaying the entry data or the entry numbers.

BRIEF DESCRIPTION OF THE DRAWINGS

Further features and exemplary advantages of the present invention will become apparent from the following detailed description, taken in conjunction with the appended drawings, in which.

DETAILED DESCRIPTION

Figure 1:
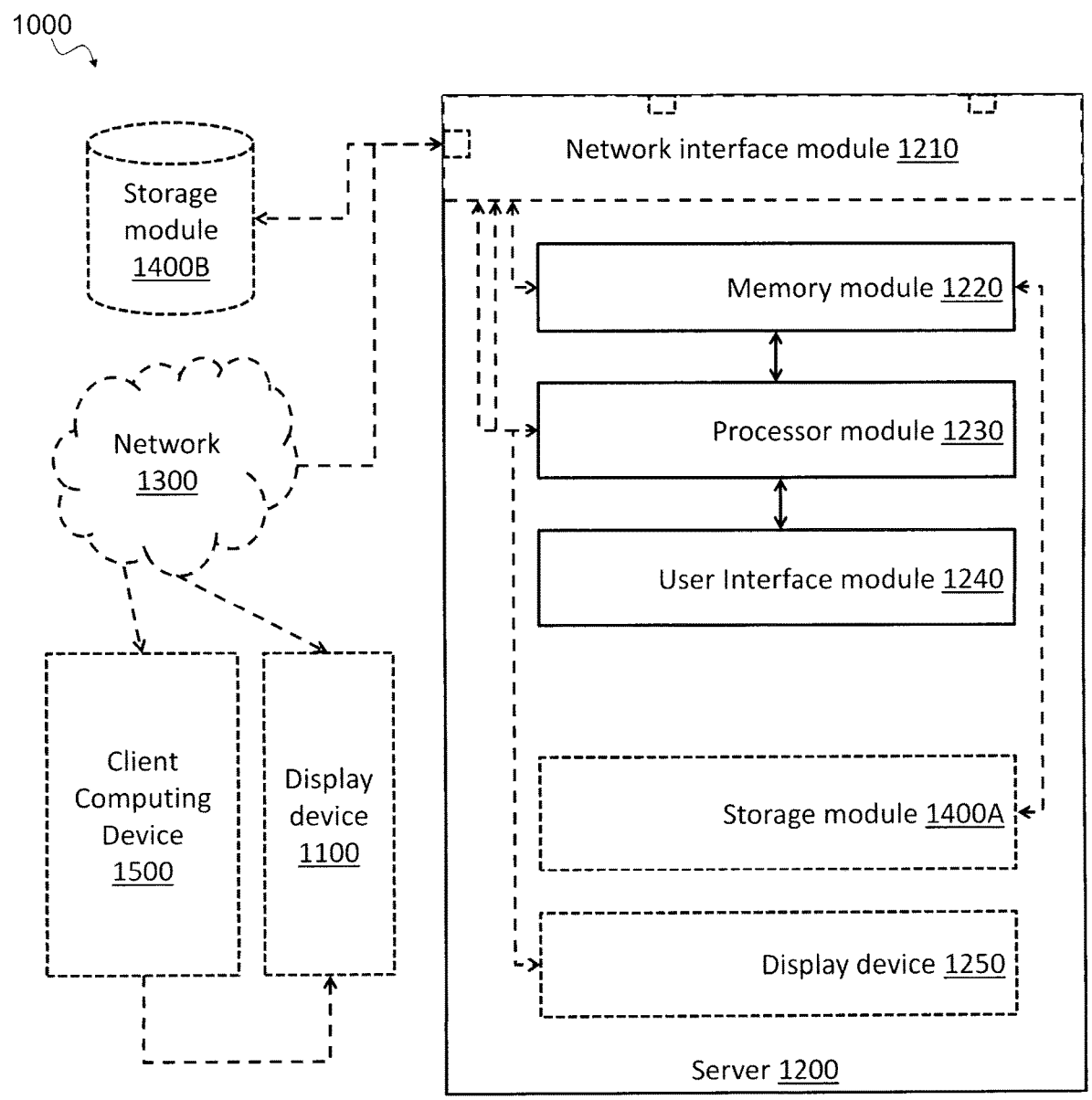
FIG. 1 is a logical modular representation of an exemplary system comprising a server for deterministically selecting the winner of a raffle from a plurality of raffle tickets.

A preferred embodiment of the present invention relates to a computer system for executing a raffle or lottery in a trustworthy, fair, reproducible, deterministic, and transparent way without use of a random process. In a preferred embodiment of the present invention, the winner of the raffle is selected based on inputs provided by the participants in the raffle (i.e., the users of the raffle computer system). The winner of the raffle is selected in such a way that the results can be verified by the participants without the participants having to trust the administrator of the raffle. In a preferred embodiment of the present invention, the raffle occurs via a network and preferably online via the Internet.

A traditional raffle system or process comprises two steps. At the first step, participants acquire one or more raffle tickets, wherein each raffle ticket has a unique identifier ("ID"). In order to participate, the participants may have to pay a certain amount per raffle ticket. The second step occurs once all the raffle tickets have been acquired. The second step comprises a draw process for randomly selecting one or more winning tickets. The draw process may be a physical or mechanical process, such as a spinning wheel or tombola or drawing a ticket from a hat or bucket. Alternatively, the draw process may be a computer using a random number generator to select a winning raffle ticket based on the ticket IDs. A problem with the physical or mechanical draw processes is that they do not scale well to online use cases, and in particular to online uses cases with a very large number of participants, which the online raffle makes possible. A problem with the computer-based draw process is that it requires the participants to trust the administrator of the raffle and the computer system selecting the winning raffle ticket. There is no straightforward way for the participants to confirm that the software on the computer system is selecting the winning raffle ticket in a fair and unbiased way. If potential participants cannot trust the administrator or the draw process, said potential participants will be less likely to participate in the raffle, thereby making the raffle less successful.

In contrast with traditional raffle processes, the present invention uses a deterministic rather than a random process for selecting the winning raffle ticket, wherein the draw process is based on entry data provided by the participants and associated with the raffle ticket.

One embodiment in accordance with the teachings of the present invention, comprises a server and a plurality of remote client computers connected to the server via a network, preferably the Internet. In the preferred embodiment, the server hosts a website, and the plurality of remote client computers interact with the raffle process on the server via the website. An administrator may create a new raffle using a user interface of one of the plurality of remote client computers. The said remote client computer sends the request to create a new raffle to the server via the network. Alternatively, the administrator may create the new raffle using a user interface of the server. The server creates a new active raffle instance. which is associated to a unique raffle ID for identifying the raffle. When creating the raffle, the administrator may specify a number of raffle tickets in the raffle. Alternatively, the number of raffle tickets in the raffle may be open-ended. Let "N" refer to the number of raffle tickets in the raffle. Each ticket in the raffle has a unique ticket ID. The ticket IDs may be the natural numbers $\mathbb{N}$ 1 to N. such that each raffle ticket is associated with one ticket ID from the set of numbers $\{1, 2, 3, \ldots N\}$, and vice versa. This manner of associating ticket IDs to raffle tickets provides a sequential ordering of the raffle tickets. Ticket IDs may also be represented by alphanumeric characters. For the sake of convenience, throughout the description ticket IDs will be referred to as numbers, but a skilled person will understand that there are other ways of representing the ticket IDs. Furthermore, skilled persons will recognize that other ways of associating and/or generating the unique ticket IDs may be used in the context of the disclosed embodiments.

In one embodiment of the present invention, once the raffle is created, the first step of the raffle process begins. The first step of the raffle process consists of participants in the raffle acquiring or reserving raffle tickets. While the present invention could be used in the context of a single raffle being proposed, it is expected that many raffles could be handled simultaneously (e.g., on a single server or on different servers using a single advertisement server for making the list of raffles available to the public). In some embodiments, a participant may request a list of the active raffles through a user interface of one of the plurality of remote client computers. Said remote client computer sends the request via the network to the server. The server responds to the request by providing a list of raffle IDs to the remote client computer.

The server may also include meta-data regarding the raffle in the response. Said meta-data may include, for example, the name of the raffle, the prize associated with the raffle, the name and/or contact information of the administrator running the raffle, the number of available tickets remaining, the available and/or reserved ticket IDs, the type of entry data to be provided, or a deadline for entering the raffle. Skilled persons will recognize that other means of providing the list of the active raffles to the participant may be used (e.g., in a casino using a proprietary interface on a proprietary device acting as the remote client computer, using a multicast-based solution, etc.).

The participant may then reserve a raffle ticket (e.g., in one of the listed raffles) through the user interface of the remote client computer. In reserving the raffle ticket, the participant may additionally specify secret data to be associated with the raffle ticket. For the sake of convenience, throughout the description of different examples of the present invention, reference will often be made to a secret entry number representing the secret data associated by the participant to the raffle ticket. Skilled persons will understand that, in the context of the present invention, the secret data may represent any value that computers are expected to be able to manipulate in a deterministic manner (e.g., number, string of characters or symbols, digital image, etc.). While the simplest representation of the secret data is a numerical value selected from the natural numbers $\mathbb{N}$, it will be understood that the present invention is not limited by reference to this example.

The remote client computer encrypts the secret entry number and sends the request to acquire a raffle ticket to the server via the network. The request to reserve a raffle ticket may comprise the raffle ID, the encrypted secret entry number, a participant ID, a ticket ID. In response to the request, the server decrypts the secret entry number and stores it on a secure encrypted storage module and/or memory module of the server in association with the raffle ID. the participant ID, and the ticket ID. Optionally, if the requested ticket ID has already been reserved, the server may in response fail to reserve the raffle ticket and send a ticket reservation failure message to the remote client computer, which may include a list of available ticket IDs. In some other embodiments, a blockchain-based solution may be used to convey the information from the remote client computer to the server and the server does not decrypt the secret number and store the secret number until required to do so in the context of the raffle being performed, the blockchain storing and maintaining the information secured until then.

Optionally, the request to reserve a raffle ticket need not specify a ticket ID, in which case the server will select the ticket ID. Whenever the secret entry number is communicated between the server and one of the plurality of remote client computers, integrity of the raffle needs to be maintained. In a set of embodiments, encryption is used to prevent certain well-known attacks, such as man-in-the-middle attacks, that could be used to manipulate the raffle process to produce a desired winner. In other embodiments, securing integrity of the raffle may be provided by a parallel system such as a blockchain-based solution.

According to one embodiment of the present invention, once the first step of the raffle process is complete, the second step is triggered. The first step may complete when, for example, all of a fixed number of raffle tickets N have been reserved by participants, when a specific date and time occur, or when any other event occurs as, for instance, when a combination of number of valid raffle tickets is received and a timestamp occurs (e.g., given raffle ID closing on the following Friday at midnight after receipt of 100,000 valid tickets). In some embodiments, the condition upon which the first step completes is disclosed and optionally advertised to the public. The disclosure of the manner in which a raffle closes could be made to enhance trust in the process while the advertisement may be made, before closure of the raffle, to entice participation of more participants in the raffle. The administrator could also terminate the first step of the raffle process at any time through a user interface of one of the plurality of remote client computers or through a user interface of the server.

The second step of the raffle process comprises the drawing process for selecting a winner of the raffle. In the preferred embodiment of the present invention, the winning raffle ticket is selected in the following way. First, the sum of all the secret entry numbers associated with each of the raffle tickets is calculated. Let O represent the result or output of this summation. Second, the following mathematical mapping function is used to map the result O onto the set of ticket IDs {1, 2, 3, . . . N}:

$$n=(\text{absolute\_value}(O) \text{ modulo } N)+1$$

The above mathematical mapping function will produce a result n that falls within the set of ticket IDs {1, 2, 3, . . . N}, such that n corresponds to the ticket ID of the winning raffle ticket. The participant associated with the winning raffle ticket is the winner of the raffle, and may receive any prize associated with the raffle. The winner of the raffle may be declared to the participants of the raffle, for example, by publishing the winner of the raffle on a website, sending the information via email to the participants or otherwise providing the information to the public. It will be recognized that as long as the secret entry numbers remain unknown to the other participants in the raffle, no participant will be able to anticipate the result of the raffle or manipulate the results of the raffle to favor a particular participant. The mathematical functions for selecting the winner based on the secret entry numbers is deterministic and repeatable. The secret entry numbers in combination with the deterministic mathematical function completely determine the winner of the raffle. Anyone who knows the secret entry numbers would be able to predict with certainty the winner of the raffle. Moreover, anyone who knows all the other entry numbers would be able to select their own entry number to guarantee that their ticket, or any other ticket, is selected as the winning ticket. It is for this reason that integrity of the raffle (e.g., using encryption of the entry numbers) must be ensured. In the preferred embodiment, the administrator of the raffle does not have access to the entry numbers so that the participants in the raffle do not need to trust the administrator of the raffle.

For example, suppose a particular raffle process has 5 raffle tickets with the following entry numbers:
Ticket ID 1: 799
Ticket ID 2: 8314
Ticket ID 3: -8842605
Ticket ID 4: 8164014
Ticket ID 5: 9374641

Since there are 5 tickets, the value of N in this case is 5. According to the preferred embodiment of the present invention, the winning ticket number will be calculated as follows:

winning ticket $ID =$ $\text{absolute\_value}(799 + 8314 - 8842605 + 8164014 + 9374641) \bmod 5 + 1 =$ $\text{absolute\_value}(8705163) \bmod 5 + 1 = 8705163 \bmod 5 + 1 = 3 + 1 = 4$ The winning raffle ticket in this case is the ticket with ID 4.

A skilled person will understand that the above process for selecting a winning raffle ticket may not result in a winner if there are gaps in the ticket IDs, where a "gap" means that a ticket ID in the set of ticket IDs is not associated with a raffle ticket. Whether there are gaps depends on how the first step of the raffle process (the ticket reservation step) is conducted. For example, there will not be gaps in the ticket IDs if the raffle contains a fixed number of raffle tickets and the first step of the raffle process terminates when all the raffle tickets have been reserved. In this case, the above process is guaranteed to select a winner. However, if there is an open-ended number of tickets and participants are able to cancel their ticket reservations, gaps in the ticket IDs could occur and the above process is not guaranteed to select a winner. That is, the above process could select a ticket ID that is not associated with raffle ticket. A skilled person will understand that there are a number of solutions to ensure that the raffle results in a winner even if the number of raffle tickets is open-ended. For example, the raffle system might not allow participants to cancel their raffle tickets once they have been reserved. As another possibility, the raffle system might reorder ticket IDs dynamically if a raffle ticket is cancelled. For example, if ticket with ID X is cancelled, then the IDs of tickets X+1 to N could be changed to X to N−1, in order to remove the gap. Alternatively, the winning ticket could be the $n^{th}$ ticket in a sequential ordering of the raffle tickets based on their ticket IDs. A skilled person will understand that a number of other solutions exist.

In one embodiment of the present invention, once the winner of the raffle has been selected according to the above process, the third step of the process may be triggered. The third step comprises the verification process. The verification process comprises making the results of the raffle, the mathematical functions used, and the secret entry numbers associated with their respective raffle ticket IDs (collectively, the "Raffle Verification Data") available to the participants of the raffle. For example, the Raffle Verification Data may be displayed on a public website or on a secure website accessible only to the participants in the raffle. Alternatively, the Raffle Verification Data may be sent to the participants via email. The Raffle Verification Data may also be sent to the participants or the plurality of remote client computers in any other manner. The Raffle Verification Data enable each of the participants to confirm that the secret entry number associated with their raffle ticket ID is correct. The Raffle Verification Data also enables the participants to confirm the result by applying the mathematical functions to the secret entry numbers. In this manner, the participants can trust the result and the raffle process without having to trust the administrator of the raffle.

Reference is made to the drawings in which FIG. 1 shows a logical modular representation of an exemplary system 1000 in accordance with the teachings of the present invention. The system 1000 comprises a server 1200 for deterministically selecting the winner of a raffle from a plurality of raffle tickets. The server 1200 comprises a memory module 1220, a processor module 1230, a user interface module 1240, a network interface module 1210, and a storage module 1400. The storage module 1400 may be a standard hard disk drive, a solid state drive, a tape drive, RAID storage, or any form of non-volatile memory that meets the various requirements for storing and retrieving the plurality of raffle tickets and other information related to the raffle. The storage module 140013 may be externally connected to the server 1200. The storage module 1400 may be a remote network storage connected to the server 1200 via the network 1300 (not shown). Alternatively, the storage module 1400A may be integrated with the server 1200. The server 1200 may further comprise a display device 1250, which may be a remote display device connected to the server 1200 through the network 1300 (not shown), a display device directly connected to the server 1200 (not shown), or an integrated display device 1250. The network interface module 1210 is for sending and receiving data through the network 1300 to and from the plurality of remote client computers 1500.

The system 1000 also comprises a plurality of client computing devices 1500. which may be personal computers, laptops, tablets, or mobile devices. The client computing devices 1500 enable participants in the raffle to, inter alia, reserve raffle tickets, enter their secret entry numbers, and verify the results of the raffle. One or more of the client computing devices 1500 may also be used by an administrator of the raffle to remotely manage the raffle process on the server 1200. Each of the client computing devices 1500 may further comprise a display device 1100, which may be a remote display device 1100 connected to the client computing device 1500 through the network 1300, a display device 1100 directly connected to the client computing device 1500, or an integrated display device (not shown). The client computing devices 1500 may further comprise a network interface module (not shown) for sending and receiving data through the network 1300 to and from the server 1200.

The system 1000 further comprises a network 1300 for connecting the server 1200 and the client computing devices 1500. Communication over the network 1300 may occur using e.g., TCP/IP and Ethernet or ATM SONET/SDNET; over air, copper wires, optical fiber, or any other physical support capable of carrying data. In one embodiment, the network 1300 is the Internet. The client computing devices 1500 may be connected to the network 1300 in a variety of ways, such as via a wired network, a cellular network, via Wi-Fi, or via Bluetooth. A skilled person will understand that the server 1200 may comprise multiple servers 1200 in a cluster or other similar shared-processing or distributed-processing architectures, whether in a single location or over cloud computing.

The server 1200 may provide an online service to the participants and/or administrator on the client computing devices 1500. The online service may consist of a web application and/or mobile app and/or standard desktop application. The online service may provide a login user interface to participants and/or the administrator, wherein the participants and/or administrator can provide a username and password to gain access to the online service. The online service may provide to the participants and/or administrator an initial registration user interface to enter personal information, payment or banking information, and select a username and password. The online service may provide the administrator with a user interface for remotely managing the raffle process on the server 1200. The online service may provide the participants with a user interface for participating in the raffle by, for example, reserving a raffle ticket, entering a secret entry data, receiving the raffle results, and verifying the raffle results. The server 1200 may also enable the administrator to manage the raffle process directly on the server 1200 via a user interface of the user interface module 1240 displayed on the display device 1250.

Figure 4:
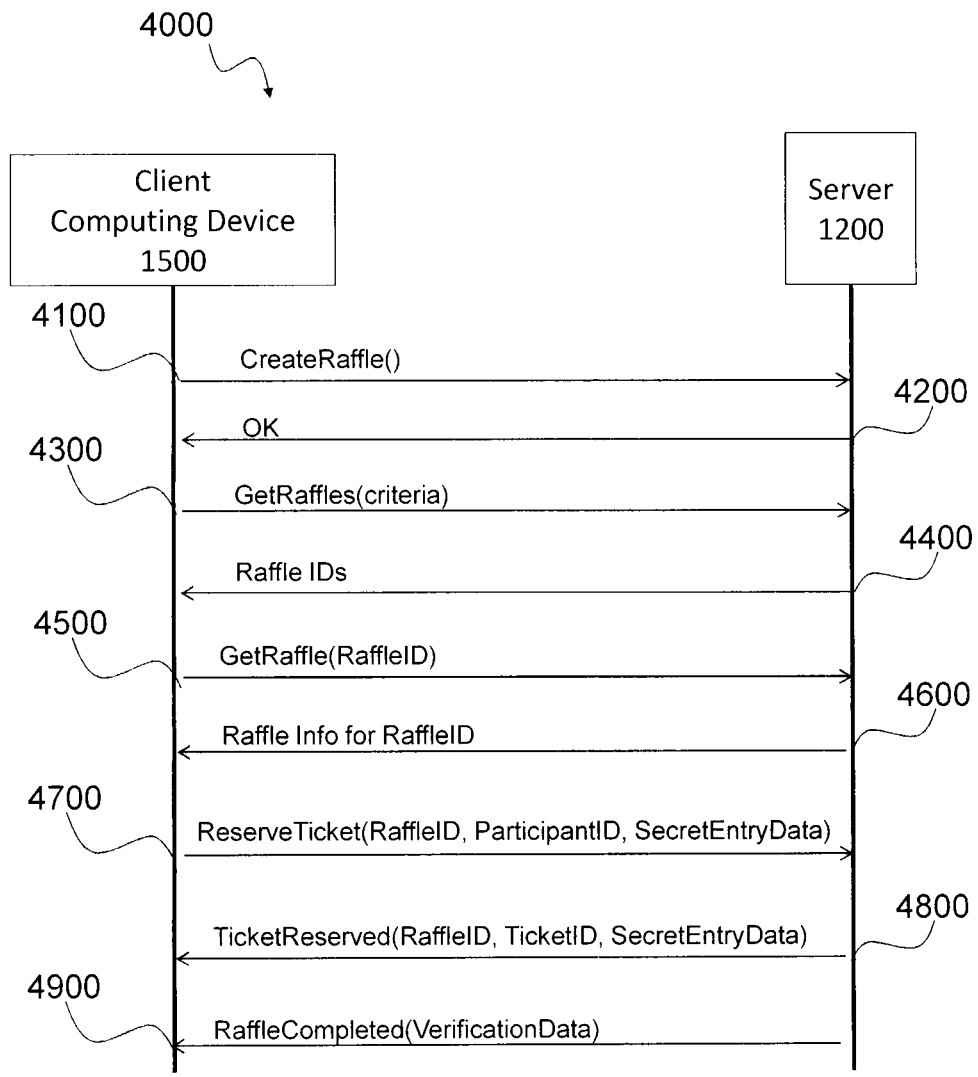
FIGS. 4 is an exemplary nodal operation and flow chart for deterministically selecting the winner of a raffle from a plurality of raffle tickets.

Reference is now made concurrently to FIG. 1, which shows a computer readable memory module 1220 having recorded thereon statements and instructions for execution by a server computer 1200 for securely and deterministically selecting a winner for a raffle from a plurality of received raffle tickets taking into account selected content from the received raffle tickets, and FIG. 4, which shows an exemplary nodal operation and flow chart 4000 related thereto. A raffle is initially created by an administrator of the raffle. The administrator may be one or more people or a company. The administrator may create the raffle remotely at one of the remote client computing devices 1500 by sending 4100 a create raffle request from the client computer 1500 to the server 1200 through the network 1300. Alternatively, the administrator may create the raffle locally (not shown) at the server computer 1200. The user interface module 1240 may provide the user interface, either locally or remotely, that enables the administrator to create and manage the raffle. In response to the request, the server 1200 may respond to the client computer 1500 with an OK message 4200 through the network 1300 for confirming creation of a new raffle and associate a unique raffle ID to the newly created raffle. In creating the raffle. the administrator may specify a fixed number of raffle tickets, may put no limit on the number of raffle tickets and/or may otherwise specify the conditions upon which the raffle is to be handled (termination condition, public disclosure policies, etc.). In some embodiments, the conditions that surround the management of a given raffle may be formatted and handled as a "smart contract", e.g., using blockchain technology. At any time up until the drawing process for selecting a winner, the administrator may delete the raffle. In preferred embodiments, criteria that define the circumstances in which a raffle is to be deleted are disclosed in advance of any raffle and the actual reason of the deletion are also provided whenever the situation occurs (e.g., proof or even hint that the raffle is or may have been compromised). The policy applicable to a deletion may also be provided in advance (e.g., reimbursement or credit for a new participation).

The statements and instructions recorded on the memory module 1220 comprise code means for receiving the plurality of raffle tickets at the server computer 1200 through a computer network 1300 from at least one remote client computer 1500, wherein each raffle ticket from the plurality of raffle tickets comprises entry data for obtaining an entry number such that the entry data of at least one of said raffle tickets is selected under control exerted only at the remote client computer 1500 and is strongly encrypted by the client computer 1500 for communication over the computer network 1300 to the server computer 1200. The user interface module 1240 of the server 1200 may provide the remote client computers 1500 with a user interface enabling participants to enter a raffle. Alternatively, the server 1200 may provide the remote client computers 1500 with data with which the remote client computers 1500 may create the user interface. From the remote client computer 1500, the participant may, in some embodiments, send a request 4300 to the server 1200 through the network 1300 for a list of the active raffles. The server 1200 may respond 4400 to this request with the raffle IDs of the active raffles through the network 1300. The participant may request 4500 further information regarding a particular raffle ID, to which the server 1200 will respond 4600 with further information about the raffle, such as the name of the raffle, the administrator of the raffle, the date and time of the raffle, the prize associated with the raffle, the number of raffle tickets, the number of reserved raffle tickets, the ticket IDs of the reserved and/or available raffle tickets, or any policies related to the raffle (e.g., regarding ticket cancellation).

The participant may then reserve a ticket in a particular raffle. In doing so, the participant selects secret entry data that directly represent or can otherwise be used to obtain a secret entry number. The entry data is selected under control exerted only at the remote client computer 1500, which means that the entry data is either entered at the remote client computer 1500 or at least that the generation of the entry data is initiated at the remote client computer and the entry data or entry number is reviewed by the participant at the remote client computer 1500 prior to being provided to the server 1200. In the preferred embodiment, the participant enters a number at the remote client computer 1500, in which case the entry data is the entry number. Alternatively, the client computer 1500 may randomly select a number for the participant upon request by the participant and display the number to the participant, in which case again the entry data is the entry number. Alternatively, the server computer 1200 may randomly select a number for the participant upon request by the participant and send the number to the client computer 1500 for display to the participant, in which case again the entry number is the entry data. Alternatively, the participant enters at the client computer 1500 a string of characters as the entry data, which can be converted into the entry number, for example by counting the number of characters in the string or by summing the ASCII or UTF-8 values of each of the characters in the string. Alternatively, the participant may provide at the client computer 1500 an image as the entry data, which can be converted into the entry number by, for example, counting the bytes in the image or summing the RGB color codes of all or a subset of the pixels. Alternatively, the entry data may be based on the date and/or time that the participant reserves the raffle ticket. For example. if the participant reserves a ticket at 10:10 AM, the entry data may be the number 1010. As another alternative, the entry data may be a combination of a number selected by the participant and the date and/or time that the participant reserves the raffle ticket. As previously indicated, skilled persons will understand that, in the context of the present invention, the secret data may represent any value that computers are expected to be able to manipulate in a deterministic manner (e.g., number, string of characters or symbols, etc.). If necessary, the conversion of the entry data to entry number may be carried out by the client computer 1500 or by the server 1200.

The client computer 1500 then sends 4700 a request to reserve a raffle ticket to the server 1200 through the network 1300, the request comprising a participant ID, a raffle ID and the secret entry data (which may be the entry number). Optionally, the request may further comprise the ticket ID to be reserved. In order to ensure the integrity of the raffle, the client computer 1500 strongly encrypts the request to reserve a raffle ticket, or at least strongly encrypts the secret entry data, for communication through the network 1300. The server 1200 receives this plurality of entry tickets from the plurality of client computers 1500. The server 1200 responds 4800 to each request with a ticket reserved confirmation, wherein the confirmation may include the raffle ID, the ticket ID, and the secret entry data (which may be a number). The server 1200 strongly encrypts the ticket reserved confirmation, or at least strongly encrypts the secret entry data, for communication through the network 1300. A skilled person will understand "strong encryption" to mean any encryption algorithm that is highly resistant to cryptanalysis and for which there is no known attack, such as PGP, AES, and Elyptic-curve cryptography. In one embodiment, the raffle process is implemented as a web application that uses HTTPS to encrypt the data exchanged between the server 1200 and the remote client computers 1500 through the Internet 1300. In one embodiment, the client computers 1500 and the server 1200 use a form of public-key cryptography to communicate the secret entry data back-and-forth. Other forms of encryption may also be used. Each participant may reserve more than one raffle ticket. Reserving more than one raffle ticket may comprise sending a single request or sending one request for each raffle ticket. Each raffle ticket reserved by a single participant may have the same entry data or different entry data.

Encryption is necessary to ensure the integrity of the raffle process and to ensure that participants can trust the raffle process. A participant who knew all the other entry data and the mathematical functions for selecting the winner would be able to select their own entry data to guarantee that their ticket, or another ticket, would win the raffle. It is therefore necessary to ensure the integrity of the raffle that the entry data are kept secret. To keep the entry data secret it is necessary to use encryption to protect the raffle process from well-known attacks. For example, if the entry data were not encrypted for communication through the network 1300, an attacker could observe the traffic on the network 1300 to discover all of the entry data. If the entry data were not encrypted when stored on the server 1200, an attacker could discover all the entry data in a raffle by gaining access to the server 1200. Encryption is therefore necessary to ensure the integrity of the raffle process. A skilled person will recognize that such encryption must be carried out by a computer system. A human would not be able to carry out the calculations for encrypting and decrypting the entry data fast enough to provide a raffle system with the required response times.

The statements and instructions recorded on the memory module 1220 comprise code means for storing, from the server computer 1200, the plurality of raffle tickets on a storage module 1400 of the server computer 1200. The server 1200 reserves a raffle ticket for a particular participant in a particular raffle by associating the raffle ID, participant ID, and secret entry data that are received in the ticket reservation request with an available ticket ID. This association may be made for example in a database stored on the storage module 1400.

Alternatively, the association may be stored in a database in the memory module 1220 or in a combination of the memory module 1220 and the storage module 1400. Alternatively, some mechanism other than a database may be used to store the associated raffle ticket data. In this particular embodiment, the entry data is not decrypted before it is stored. It is stored on the storage module 1400 in its original encrypted form. The server 1200 does not need to know the content of the entry data at this stage. Alternatively, the server 1200 may decrypt the entry data at this stage and then re-encrypt it prior to storage on the storage module 1400. As another alternative, the server 1200 may decrypt the entry data and store the entry data in a non-encrypted form on the storage module 1400. Some record is made in the memory module 1220 or the storage module 1400 that the particular ticket ID in a particular raffle has been reserved and is no longer available. Standard concurrency techniques, or the use of a database that embody such techniques, may be used to ensure that the same ticket ID is not simultaneously reserved by two different participants.

The statements and instructions recorded on the memory module 1220 comprise code means for decrypting, at the server computer 1200, the entry data. As noted above, the entry data in the ticket reservation request 4700 is encrypted for communication through the network 1300. Alternatively, the entire ticket reservation request may be encrypted for communication through the network 1300. At some point in the process, the server 1200 decrypts the entry data and possibly the other data included in the ticket reservation request. In one embodiment, the server 1200 decrypts the entry data upon receiving the ticket reservation request and prior to storing the entry data on the storage module 1400. Alternatively, the entry data is stored on the storage module in its original encrypted form. In this case, the decryption stage only occurs when the second stage (the draw process to select a winner) begins.

The first stage comprises the ticket reservation stage. This first stage can complete upon any number of conditions being satisfied. For example, the administrator may set a fixed number of raffle tickets for the raffle, such that the first stage completes once that fixed number of raffle tickets has been reserved. Alternatively, the administrator may select that the first stage lasts for a fixed number of days or completes at a particular date and time. Alternatively, the administrator may leave the first stage of the raffle open-ended such that it is left to the discretion of the administrator to terminate the first stage at any time. For example, the administrator may use a user interface of a client computer 1500 or the server 1200 to indicate at any time that the first stage of the raffle process has completed. Alternatively, any other condition which can be detected by the server 1200 may be used to determine when the first stage of the raffle has completed. Alternatively, some combination of the foregoing may be used. For example, the first stage of the raffle process may terminate after a certain amount of time has passed or a certain number of raffle tickets have been reserved, whichever occurs first. Once the first stage completes, the server 1200 may retrieve the raffle tickets from the storage module 1400 or the memory module 1220, wherein the raffle tickets comprise an association of at least the raffle ID, participant ID, secret entry data. and ticket ID. Upon retrieving the raffle tickets, the server 1200 decrypts the entry data. The decrypted entry data may then be stored in the memory module 1220 in association with the raffle ID, participant ID, and ticket ID for further processing in order to select the winner of the raffle.

The statements and instructions recorded on the memory module 1220 comprise code means for obtaining a first output related to the raffle by computing a first deterministic mathematical function taking a first plurality of inputs, wherein the first plurality of inputs comprise the entry numbers. As noted above, the entry data stored in the storage module 1400 may already be entry numbers or they may be another form of data that can be converted to entry numbers. For example, the entry data may be a string of characters entered by the participant that can be converted to an entry number by summing the number of characters in the string or summing the ASCII or UTF-8 values of the characters in the string. As another example, the entry data may be an image, which can be converted to an entry number by counting the number of bytes in the image. If the entry data is not yet an entry number, the server computer 1200 converts the entry data for each raffle ticket to an entry number, resulting in a plurality of entry numbers, one for each raffle ticket. A deterministic mathematical function is then applied to the entry numbers. The mathematical function is deterministic in the sense that the same inputs to the function will always produce the same outputs: there is no random component to the first mathematical function. In the preferred embodiment, the first mathematical function is addition, such that the first mathematical function takes the sum of all the entry numbers. Alternatively, the first mathematical function may be subtraction, such that the first mathematical function subtracts all the entry numbers from one another as follows: $n_1-n_2-n_3-\ldots-n_N$, wherein $n_i$ is the $i^{th}$ entry number and there are a total of N entry numbers.

Alternatively, the first mathematical function may add, subtract, or multiply a constant value (which is disclosed to the participants prior to the draw process) to either of the above results. The first mathematical function may also divide any of the above results by a constant value (which is disclosed to the participants prior to the draw process). Alternatively, the constant value may correspond to the number of raffle tickets reserved in the raffle. Alternatively, the number of raffle tickets may factor into the first mathematical function in some other way. Alternatively, the first mathematical function may alternate between addition and subtraction as follows: $n_1+n_2-n_3+n_4-\ldots+/-n_N$, wherein the final operation depends on whether the number of entry numbers is even or odd. Any other alternation between or combination of addition and subtraction would also be possible. The first mathematical function used may vary depending.

for example, on the date and time of the draw process or the number of participants in the raffle. Any mathematical function may be used as the first mathematical function as long as it is deterministic (i.e., given the same inputs it produces the same output) and it is not possible to predict the output of the first mathematical function based on a single entry number. That is, it is not possible for a participant to manipulate the first mathematical function to produce a desired output (or increase the chances of a particular output occurring) by selecting a particular entry data regardless of the entry data of the other participants.

The statements and instructions recorded on the memory module 1220 comprise code means for selecting a winning raffle ticket for the raffle by obtaining a second output related to the raffle by computing a second deterministic mathematical mapping function taking as a second input the first output of the first mathematical function, wherein the second output corresponds to the winning raffle ticket of the plurality of raffle tickets. Optionally, the raffle ticket IDs correspond to the natural numbers in the set $\{1, 2, 3 \ldots N\}$, where there are N raffle tickets. It will be appreciated that since the output of the first mathematical function may be any number whatsoever, said output will likely not correspond to one of the raffle ticket IDs. In order to select a winning raffle ticket using the output from the first mathematical function, said output is mapped to one of the ticket IDs in the set $\{1, 2, 3 \ldots N\}$ using a second deterministic mathematical mapping function. The second mathematical mapping function is deterministic in the sense that the same inputs will produce the same output: there is no random component to the second deterministic mathematical mapping function. The second mathematical function is a mapping function in the sense that it maps one set of numbers (e.g., the set of natural numbers, the set of whole numbers, the set of integers, or the set of real numbers) onto the set of numbers $\{1, 2, 3 \ldots N\}$ corresponding to the ticket IDs. Optionally, the output from the first mathematical function corresponds to an integer value (note that the user interface of the client computers 1500 may restrict the inputs of the participants to ensure this result) and the second deterministic mathematical mapping function is the following:

$$n = (\text{absolute\_value}(O) \bmod N) + 1$$

where O corresponds to the output of the first mathematical function, N corresponds to the number of raffle tickets, and n corresponds to the result of the second mathematical function.

The absolute_value function returns the non-negative value of the integer O. The modulo function returns the remainder when absolute_value(O) is divided by N. For example, 10 modulo 5 is 0, 7 modulo 5 is 2, and 3 modulo 5 is 3. It will be appreciated that the result of absolute_value (O) modulo N is a number in the range 0 to N−1, such that adding 1 to this result produces a number in the set $\{1, 2, 3 \ldots N\}$, as desired. It will be appreciated that the above second mathematical mapping function produces an output n that is in the set $\{1, 2, 3 \ldots N\}$ and is a function of the output O of the first mathematical function. The ticket IDs need not correspond to the natural numbers in the set $\{1, 2, 3 \ldots N\}$. For example, the ticket IDs may correspond to the numbers in the set $\{0, 1, 2 \ldots N-1\}$ or $\{5, 6, 7 \ldots N+4\}$. That is, the set of ticket ID numbers may correspond to any set of numbers and the second mathematical mapping function may be appropriately adapted to produce a number in this set. Furthermore, the first mathematical function need not produce an integer as an output. The first mathematical function may produce a real number as an output. In this case, the second mathematical mapping function may be adapted to round the output O of the first mathematical function to the closest integer. The value n that is computed using the second mathematical mapping function corresponds to one of the ticket IDs such that the raffle ticket with the ticket ID equal to n is the winning raffle ticket, and the participant holding said raffle ticket is the winner of the raffle.

More generally, let f denote the second mathematical mapping function, let X denote the output domain of the first mathematical function, and let Y denote the domain of ticket ID numbers. X and Y may comprise any numbers whatsoever. The function f takes a number x from the domain X as input and outputs a number y in the domain Y. The second mathematical mapping function f may be any mathematical mapping function whatsoever as long as it has the following two properties. First, the function f is a surjective or onto function. That is. for every element y in the domain Y there is at least one element x in X such that f(x)=y. Second, the function f maps every element in X onto an element in Y. That is, f does not map any element in X to an element outside Y. Optionally, f may have the further property that the number of x's that are mapped to a given y are equal to or roughly equal to the number of x's that are mapped to any other y.

In summary, the first and second mathematical functions may be expressed as a single mathematical function:

$$n = \left( \text{absolute\_value} \left( \sum_{i=1}^{N} \text{entry\_number}_i \right) \text{ modulo } N \right) + 1$$

where N corresponds to the number of raffle tickets, entry_number$_i$ corresponds to the entry number of the $i^{th}$ raffle ticket, and n corresponds to the winning raffle ticket ID.

Optionally, the statements and instructions recorded on the memory module 1220 further comprise code means for specifying a sequential ordering of the plurality of raffle tickets. As noted above, the ticket IDs of the raffle tickets may correspond to the natural numbers in the set {1, 2, 3 . . . N}, or to some other sequential ordering of numbers and/or alphanumeric characters, in which case the ticket IDs may provide the sequential ordering of the raffle tickets.

Alternatively, the sequential ordering of the raffle tickets may be provided in some other manner. For example, the raffle tickets may be ordered based on the date and time they were reserved. That is the sequential ordering of the raffle tickets is the order that they were reserved. As another alternative, the sequential ordering of the raffle tickets may be based on the alphabetical ordering of the names of the participants on the raffle tickets. Optionally, the winning raffle ticket may be selected based on the sequential ordering of the raffle tickets rather than based on the ticket ID, particularly when the sequential ordering is not based on the ticket IDs or when the ticket IDs are not represented by numbers. Specifically, the winning raffle ticket may be the $n^{th}$ raffle ticket in the sequential ordering of the raffle tickets where n is the result computed using the second mathematical mapping function. In such cases, the ticket IDs need not be a set of sequentially ordered numbers.

Optionally, the statements and instructions recorded on the memory module 1220 may further comprise code means for publicly disclosing the first deterministic mathematical function and the second deterministic mathematical mapping function before all the raffle tickets have been received. So that the participants can verify the result of the raffle, the server 1200 may disclose the first mathematical function and the second mathematical function to the participants. The participants can then verify that the winning raffle ticket is indeed the one that corresponds to the result of the first and second mathematical functions using the entry numbers actually submitted as inputs. Once all the raffle tickets for a particular raffle have been submitted and all the entry numbers are known. it is possible to select a first and/or second mathematical function to produce a desired result. In other words, once all the entry numbers are known, an administrator could select the first and/or second mathematical function to ensure that a particular raffle ticket is selected as the winning raffle ticket. In order to promote trust in the raffle process, the first and second mathematical functions may be disclosed prior to all the raffle tickets having been reserved. Optionally, the first and second mathematical functions may be disclosed at the beginning of the raffle process before any raffle ticket has been reserved. The first and second mathematical functions may be disclosed to the participants in a number of different ways. For example, the first and second mathematical functions may be sent from the server 1200 to the remote client computers 1500 through the network 1300 for display on the client computers 1500. Alternatively, the server 1200 may publish the first and second mathematical functions on a website that the participants can access. Alternatively, the server 1200 may send the first and second mathematical functions to the participants via email, text messaging, or some other chat or messaging protocol.

Optionally, the statements and instructions recorded on the memory module 1220 may further comprise code means for publicly disclosing an encrypted file containing the first deterministic mathematical function and the second deterministic mathematical mapping function before all the raffle tickets have been received and publicly disclosing a key for decrypting the encrypted file after selecting the winning raffle ticket. Instead of disclosing the first and second mathematical functions before all the raffle tickets have been received, a file containing the first and second mathematical functions may be encrypted and disclosed to the participants before all the raffle tickets have been received. The encrypted file may further comprise a timestamp to show that it was encrypted prior to all the raffle tickets having been received. After the draw process, the key to the encrypted file may be disclosed to the participants, enabling them to discover the first and second mathematical functions so that they can verify the result of the raffle by reproducing the calculation used to select the winner using the entry numbers actually submitted as the inputs. This manner of disclosing the first and second mathematical functions ensures that the participants are not aware of the first and second mathematical functions when they select their entry numbers. This ensures that participants cannot select entry numbers that might favour them in the raffle based on the first and second mathematical functions used. Because the encrypted file containing the first and second mathematical functions is disclosed before all the raffle tickets have been received, participants can trust that the administrator has not selected the first and second mathematical functions with knowledge of all the entry numbers to guarantee that a particular raffle ticket is the winner.

Optionally, the statements and instructions recorded on the memory module 1220 may further comprise code means for displaying on a computer monitor the winning raffle ticket. Displaying the winning raffle ticket may comprise only displaying the ticket ID of the winning raffle ticket, or it may comprise displaying the ticket ID of the winning raffle ticket along with any other information associated with the ticket, such as the participant's name, the participant's ID, or the entry data or entry number of the winning raffle ticket. The winning raffle ticket may be displayed on the display device 1250 of the server 1200. For example, the winning raffle ticket may be displayed to the administrator of the raffle, who then takes further steps to inform the participants in the raffle of the winner. Alternatively, the server 1200 may publish the winning raffle ticket on a website that the participants can access. Alternatively, the winning raffle ticket may be sent to the client computers 1500 for display thereon. As another alternative, the winning raffle ticket may be sent to the client computer 1500 belonging to the winner of the raffle for display thereon. Alternatively, the winning raffle ticket may be sent to all or some of the participants via email, text messaging, or some other chat or messaging protocol.

Optionally, the statements and instructions recorded on the memory module 1220 may further comprise code means for displaying on a computer monitor the entry data or the entry numbers of the plurality of raffle tickets after selection of the winning raffle ticket. Once the draw process is completed, the server 1200 may provide the participants with the Raffle Verification Data, which they can use to verify the results of the raffle. The Raffle Verification Data may comprise at least the entry data or entry numbers for each of the raffle tickets, the first and second mathematical functions, and the result of the second mathematical function corresponding to the winning ticket. The participants may then use this Raffle Verification Data to re-compute the winning raffle ticket to confirm the result. Furthermore, entry data or entry numbers may be provided to the participants in association with ticket IDs so that the participants can verify that their entry data and/or entry number used in the calculation was correct. Once the draw process is complete, the server 1200 may send 4900 a Raffle Completed message to the client computers 1500 through the network 1300 containing the Raffle Verification Data and in particular the entry data and entry numbers for display on the client computers 1500. For example, the server 1200 may publish the entry data or entry numbers on a web page that is accessible to the participants. Alternatively, the server 1200 may send the entry data or entry numbers to the client computers 1500 or participants via email, text messaging, or some other chat or messaging protocol. Alternatively, the entry data or entry numbers may be displayed on the display device 1250 of the server 1200 to the administrator of the raffle, who then takes further steps to provide this information to the participants. If the entry data is an entry number or if the conversion from entry data to entry number can be carried out easily by the participants (e.g., counting the number of characters in a string), then only entry data needs to be provided to the participants for verification purposes. Alternatively, if it is complicated to convert the entry data to entry numbers, then both entry data and entry numbers may be provided to the participants. The entry data or the entry numbers may only be disclosed to the participants once the ticket reservation stage is complete (i.e., after all the tickets have been received). This is because a participant who submits the last raffle ticket and who knew the first and second mathematical functions and all the entry numbers already submitted would be able to select an entry number guaranteeing that he would win the raffle. The entry numbers should remain secret and confidential until after the ticket reservation stage when no more raffle tickets may be reserved.

Optionally, the entry data may be received through a user interface of the client computer 1500. For example, the participant may enter an entry number as the entry data through a user interface of the client computer 1500. In this case the entry data is the entry number and no further conversion is required. Alternatively, the participant may enter a string of characters as the entry data. In this case, the entry number may be derived from the string in any number of ways, such as by counting the number of characters in the string. This conversion may be performed either by the client computer 1500 or by the server 1200. Alternatively, the participant may select and provide an image as the entry data through the user interface. Alternatively, the user interface may capture the location of a click by a participant, wherein the location of the click is the entry data. For example. the location of the click may be represented as a number of pixels in the x-axis (the x-value) and a number of pixels in the y-axis (the y-value). The entry number may be derived from this click location in any number of ways, for example by summing the x-value and the y-value. The user interface of the client computer 1500 may be a desktop application. Alternatively, the user interface of the client computer 1500 may be provided by the server 1200. For example, the user interface may comprise a website hosted by the server 1200 and accessed by the client computer 1500.

Optionally. the statements and instructions recorded on the memory module 1220 may further comprise code means to randomly generate the entry data at the client computer 1500, wherein the entry data are displayed at the client computer 1500 before all the raffle tickets have been received. When a participant reserves a raffle ticket, the client computer 1500 may automatically generate an entry number for the participant using a standard random number generator. Upon generating the entry number, the client computer 1500 may display the entry number to the participant prior to submitting the entry number to the server 1200. The entry number may be displayed on a physical or digital copy of the raffle ticket, which the participant keeps. Alternatively, the client computer 1500 may randomly generate any other entry data that may be used with the raffle ticket, such as a random string of characters, or randomly selecting a string of characters from a databank of text. Alternatively, the server 1200 may randomly generate the entry data upon receiving a request to reserve a raffle ticket and sends the entry data to the client computer 1500 for display thereon. The participant thus becomes aware of and has a record of the entry number so that it will later be possible for the participant to verify the result of the raffle. The participant may also be given the opportunity to modify the randomly generated entry data. The entry number may be displayed prior to the end of the ticket reservation stage in order to promote trust in the raffle process. If the entry data were only disclosed to participants after the ticket reservation stage, participants would not be able to tell whether their entry data had truly been generated randomly as opposed to selected by the administrator in order to manipulate the raffle process to guarantee a specific winner. In the preferred embodiment, the entry data are displayed to the participants upon reservation of a raffle ticket.

Optionally, the plurality of raffle tickets stored on the storage module 1400 of the server computer 1200 comprise the entry data, and wherein the entry data are strongly encrypted. The server 1200 receives the plurality of raffle tickets through the network 1300 from the plurality of client computers 1500. The received raffle tickets typically already comprise the entry data or entry number in encrypted form. The server 1200 may simply store the entry data or entry number in its original encrypted form. Alternatively, the server 1200 may decrypt the entry data or entry number and re-encrypt the entry data or entry number prior to storage on the storage module 1400. As another alternative the storage module 1400 of the server computer 1200 may be a strongly encrypted storage module, such that when the entry data or entry number is stored on the storage module 1400 as part of the raffle ticket it is automatically encrypted. A skilled person will understand "strong encryption" to mean any encryption algorithm that is highly resistant to cryptanalysis and for which there is no known attack, such as POP, AES, and Elyptic-curve cryptography. Other forms of encryption may also be used. The integrity of the raffle process depends on the confidentiality of the entry data and entry numbers. If a participant were able to discover the entry numbers of the other participants, said participant would potentially be able to manipulate the raffle process and guarantee that he would win by selecting an appropriate entry number. To protect against this, the entry data may be stored securely in encrypted form.

Optionally, the statements and instructions recorded on the memory module 1220 may further comprise code means for verifying the winning raffle ticket after selection of the winning raffle ticket. Once the draw process is completed, the server 1200 may provide the participants with the Raffle Verification Data, which they can use to verify the results of the raffle. The Raffle Verification Data may comprise the entry data or entry numbers for each of the raffle tickets, the first and second mathematical functions, and the result of the second mathematical function corresponding to the winning ticket. The participants may then use this Raffle Verification Data to re-compute the winning raffle ticket to confirm the result. Furthermore, entry data or entry numbers may be provided to the participants in association with ticket IDs so that the participants can verify that their entry data and/or entry number used in the calculation was correct. Optionally, the statements and instructions recorded on the memory module 1220 may further comprise code means for sending 4900 the entry data or the entry numbers through the computer network 1300 for display on the at least one remote client computer 1500. Once the draw process is complete, the server 1200 may send 4900 a Raffle Completed message to the client computers 1500 through the network 1300 containing the Raffle Verification Data and in particular the entry data and entry numbers for display on the client computers 1500. For example, the server 1200 may publish the entry data or entry numbers on a web page that is accessible to the participants. Alternatively, the server 1200 may send the entry data or entry numbers to the client computers 1500 or participants via email, text messaging, or some other chat or messaging protocol. Alternatively, the entry data or entry numbers may be displayed on the display device 1250 of the server 1200 to the administrator of the raffle, who then takes further steps to provide this information to the participants. If the entry data is an entry number or if the conversion from entry data to entry number can be carried out easily by the participants (e.g., counting the number of characters in a string), then only entry data needs to be provided to the participants for verification purposes. Alternatively, if it is complicated to convert the entry data to entry numbers, then both entry data and entry numbers may be provided to the participants. The entry data or the entry numbers may only be disclosed to the participants once the ticket reservation stage is complete (i.e., after all the tickets have been received). This is because a participant who submits the last raffle ticket and who knew the first and second mathematical functions and all the entry numbers already submitted would be able to select an entry number guaranteeing that he would win the raffle. The entry numbers should remain secret and confidential until after the ticket reservation stage when no more raffle tickets may be reserved.

Optionally, the statements and instructions recorded on the memory module 1220 may further comprise code means for selecting the first mathematical function from a set of mathematical functions based on a time of day. As noted above, the first mathematical function may be a wide variety of mathematical functions that can take the entry numbers as inputs and produce a number as an output. For example, the first mathematical function may be addition, subtraction, or some combination thereof. Instead of having a single first mathematical function, the statements and instructions may define a set of first mathematical functions, wherein the first mathematical function used to select the winning raffle ticket during the draw process is selected from this set of first mathematical functions. For example, the set of first mathematical functions may be {addition, subtraction}. Furthermore, the selection of the first mathematical function from the set of first mathematical functions may be based on the time of day that the draw process is performed. For example, addition may be used if the draw process occurs at any time before 12 PM, while subtraction may be used if the draw process occurs at any time after 12 PM. The set of first mathematical functions and the rules for selecting the first mathematical function from the set of first mathematical functions may be disclosed to the participants before the ticket reservation stage has completed (i.e., before all the raffle tickets have been reserved) and preferably before any raffle ticket has been reserved.

Optionally, the first plurality of inputs further comprises a number that is publicly disclosed before all the raffle tickets have been received. In addition to the entry numbers submitted by the participants, the first plurality of inputs to the first mathematical function may comprise an additional value. This value may be disclosed to the participants before all the raffle tickets have been reserved, and preferably before any raffle ticket has been reserved. The value may be a constant value or may be a variable. As an alternative option, the first plurality of inputs may further comprise a number selected based on a time of day or a property of the raffle tickets, wherein the manner for determining the number is disclosed before all the raffle tickets have been received. For example, the additional number may be the number of raffle tickets reserved in the raffle. As another example, the additional number may correspond to the time of day that the draw process is performed. For example, if the draw process occurs at 11:15 AM, the additional number may be 11. The constant value or the rules for selecting the additional number may be disclosed to the participants before all the raffle tickets have been reserved, and preferably before any raffle tickets have been reserved.

Optionally, a subset of the plurality of raffle tickets are associated with a user or participant and the entry data of each of the subset of the plurality of raffle tickets is the same. A participant may reserve more than one raffle ticket in a raffle. The participant may select the same entry data for each raffle ticket. Alternatively, the client computer 1500 or the server 1200 may receive a single entry data from the participant and apply that same entry data to each one of the participant's raffle tickets. The first plurality of inputs to the first mathematical function may comprise an input for each entry data of each raffle ticket. That is, if the participant reserves 10 tickets with the same entry data, the first plurality of inputs would comprise 10 inputs having the value of the entry number corresponding to the entry data. Alternatively, the first plurality of inputs may have only a single input for all the entry data. That is, if the participant reserves 10 tickets with the same entry data, the first plurality of inputs would comprise only one input having the value of the entry number corresponding to the entry data.

Optionally, the entry data of each raffle ticket is the entry number of each said raffle ticket. For example, the user may enter a number as the entry data through a user interface of the client computer 1500. Alternatively, the client computer 1500 or the server 1200 may randomly select a number as the entry data for the participant. In such cases and other similar cases, the entry data is the entry number and this entry data/number may be used as an input to the first mathematical function without any further conversion.

Optionally the entry data of each raffle ticket is a string of characters, and the entry number of each raffle ticket is the length of each said string of characters. The user interface of the client computer 1500 may receive a string of characters from the participant as the entry data. Alternatively, the client computer 1500 or the server 1200 may randomly generate a string of characters as the participant's entry data. The string of characters may be converted to an entry number in any number of ways. For example, the entry number may be computed by summing the number of characters in the string. As another example, the entry number may be computed by summing the ASCII or UTF-8 values of the characters in the string.

Optionally, the entry number is obtained from the entry data at the server computer 1200. As one possibility, the entry data may be sent from the client computer 1500 to the server 1200 through the network 1300 and the server 1200 may perform the calculation to convert the entry data to an entry number, where such conversion is required. Alternatively, the conversion may occur at the client computer 1500, such that the entry number is sent from the client computer 1500 to the server 1200 through the network 1300.

Optionally, the entry data of at least one of the raffle tickets is selected under control exerted only at the server computer 1200, and wherein the entry data or the entry number obtained from said entry data is sent through the computer network 1300 for display at the at least one remote client computer 1500 before all the raffle tickets have been received. As one option, the entry data may be automatically randomly generated by the server 1200 upon receiving a request to reserve a raffle ticket or upon receiving a request to generate the entry data. The server 1200 then sends a ticket reserved confirmation through the network 1300 to the client computer 1500, wherein said confirmation includes the entry data selected by the server 1200 for display at the client computer 1500. The entry data is disclosed to the participant upon reserving the raffle ticket, or at least before all the raffle tickets have been receiving, so that the participant can verify that the administrator is not manipulating the raffle process to produce a desired result. The participant may also be given the opportunity to modify the randomly generated entry data. Alternatively, the server 1200 may convert the entry data to an entry number prior to sending the entry number to the client computer 1500.

Figure 2:
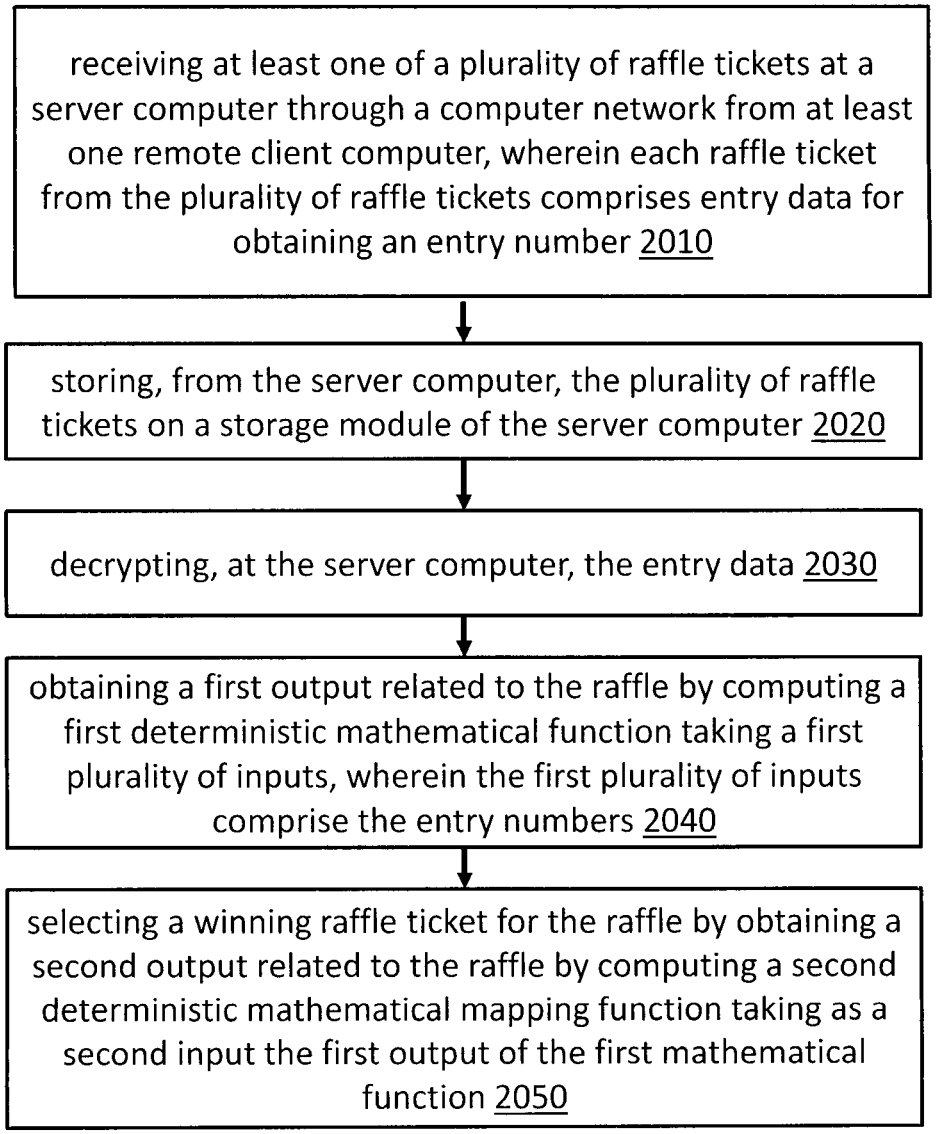
FIG. 2 is a flow chart of an exemplary method for deterministically selecting the winner of a raffle from a plurality of raffle tickets.

Reference is now made concurrently to FIG. 1 and FIG. 2, which shows a flow chart of an exemplary method 2000 for securely and deterministically selecting a winner for a raffle from a plurality of received raffle tickets taking into account selected content from the received raffle tickets. The administrator may be one or more people or a company. The administrator may create the raffle remotely at one of the remote client computing devices 1500 by sending a create raffle request from the client computer 1500 to the server 1200 through the network 1300. Alternatively, the administrator may create the raffle locally at the server computer 1200. The user interface module 1240 may provide the user interface, either locally or remotely, that enables the administrator to create and manage the raffle. In response to the request, the server 1200 may respond to the client computer 1500 with an OK message through the network 1300 and associate a unique raffle ID to the newly created raffle. In creating the raffle, the administrator may specify a fixed number of raffle tickets or may alternatively put no limit on the number of raffle tickets. At any time up until the drawing process for selecting a winner, the administrator may delete the raffle.

The method 2000 further comprises receiving 2010 at least one of the plurality of raffle tickets at a server 1200 computer through a computer network 1300 from at least one remote client computer 1500, wherein each raffle ticket from the plurality of raffle tickets comprises entry data for obtaining an entry number such that the entry data of at least one of said raffle tickets is selected under control exerted only at the remote client computer 1500 and is strongly encrypted by the client computer 1500 for communication over the computer network 1300 to the server computer 1200. The user interface module 1240 of the server 1200 may provide the remote client computers 1500 with a user interface enabling participants to enter a raffle. Alternatively, the server 1200 may provide the remote client computers 1500 with data with which the remote client computers 1500 may create the user interface. From the remote client computer 1500, the participant may send a request to the server 1200 through the network 1300 for a list of the active raffles. The server 1200 may respond to this request with the raffle IDs of the active raffles through the network 1300. The participant may request further information regarding a particular raffle ID, to which the server 1200 will respond with further information about the raffle, such as the name of the raffle, the administrator of the raffle, the date and time of the raffle, the prize associated with the raffle, the number of raffle tickets, the number of reserved raffle tickets, the ticket IDs of the reserved and/or available raffle tickets, or any policies related to the raffle (e.g., regarding ticket cancellation).

The participant may then reserve a ticket in a particular raffle. In doing so, the participant selects secret entry data that can be used to obtain a secret entry number. The entry data is selected under control exerted only at the remote client computer 1500, which means that the entry data is either entered at the remote client computer 1500 or at least that the generation of the entry data is initiated at the remote client computer and the entry data or entry number is reviewed by the participant at the remote client computer 1500. In the preferred embodiment, the participant enters a number at the remote client computer 1500, in which case the entry data is the entry number. Alternatively, the client computer 1500 may randomly select a number for the participant upon request by the participant and display the number to the participant, in which case again the entry data is the entry number. Alternatively, the server computer 1200 may randomly select a number for the participant upon request by the participant and send the number to the client computer 1500 for display to the participant, in which case again the entry number is the entry data. Alternatively, the participant enters at the client computer 1500 a string of characters as the entry data, which can be converted into the entry number, for example by counting the number of characters in the string or by summing the ASCII or UTF-8 values of each of the characters in the string. Alternatively, the participant may provide at the client computer 1500 an image as the entry data, which can be converted into the entry number by, for example, counting the bytes in the image. Alternatively, the entry data may be based on the date and/or time that the participant reserves the raffle ticket. For example, if the participant reserves a ticket at 10:10 AM, the entry data may be the number 1010. As another alternative, the entry data may be a combination of a number selected by the participant and the date and/or time that the participant reserves the raffle ticket. As previously indicated, skilled persons will understand that, in the context of the present invention, the secret data may represent any value that computers are expected to be able to manipulate in a deterministic manner (e.g., number, string of characters or symbols, etc.). If necessary, conversion of the entry data to entry number may be carried out by the client computer 1500 or by the server 1200. In preferred embodiments where the entry' data provided by the participant is not a number, the manner in which the value is converted into said number is disclosed in advance of the raffle to enhance trust in the system.

The client computer 1500 then sends a request to reserve a raffle ticket to the server 1200 through the network 1300, the request comprising a participant ID, a raffle ID and the secret entry data (which may be the entry number). In order to ensure the integrity of the raffle, the client computer 1500 strongly encrypts the request to reserve a raffle ticket, or at least strongly encrypts the secret entry data, for communication through the network 1300 (e.g., whether directly or through some other means such as a blockchain). The server 1200 receives this plurality of entry tickets from the plurality of client computers 1500. The server 1200 responds to each request with a ticket reserved confirmation, wherein the confirmation may include the raffle ID, the ticket ID, and optionally the secret entry data (which may be a number) or a manner in which the participant is able to ascertain the secret entry data being handled at the server (e.g., a URL or other reference to the secret entry data). When relevant, the server 1200 strongly encrypts the ticket reserved confirmation, or at least strongly encrypts the secret entry data, for communication through the network 1300. A skilled person will understand "strong encryption" to mean any encryption algorithm that is highly resistant to cryptanalysis and for which there is no known attack, such as PGP, AES, and Elyptic-curve cryptography. In one embodiment, the raffle process is implemented as a web application that uses HTTPS to encrypt the data exchanged between the server 1200 and the remote client computers 1500 through the Internet 1300. In one embodiment, the client computers 1500 and the server 1200 use a form of public-key cryptography to communicate the secret entry data back-and-forth. Other forms of encryption may also be used. In preferred embodiments, each participant may reserve more than one raffle ticket. Reserving more than one raffle ticket may comprise sending a single request or sending one request for each raffle ticket. Each raffle ticket reserved by a single participant may have the same entry data or different entry data.

As skilled person will acknowledge, encryption is necessary to ensure the integrity of the raffle process and to ensure that participants can trust the raffle process. A participant who knew all the other entry data and the mathematical functions for selecting the winner would be able to select their own entry data to guarantee that their ticket, or another ticket, would win the raffle. It is therefore necessary to ensure the integrity of the raffle that the entry data are kept secret. To keep the entry data secret it is necessary to use encryption to protect the raffle process from well-known attacks. That is true whether the secret entry data is sent directly between the remote client computers and the server or whether intermediary nodes and/or technologies (e.g., blockchain) are involved therebetween. For example, if the entry data were not encrypted for communication through the network 1300, an attacker could observe the traffic on the network 1300 to discover all of the entry data. If the entry data were not encrypted when stored (e.g., on the server 1200 or otherwise), an attacker could discover all the entry data in a raffle by gaining access thereto (e.g., to the server 1200). Encryption is therefore necessary to ensure the integrity of the raffle process. A skilled person will recognize that such encryption must be carried out by a computer system. A human would not be able to carry out the calculations for encrypting and decrypting the entry data fast enough to provide a raffle system with the required response times.

The method 2000 further comprises storing 2020, from the server computer 1200, the plurality of raffle tickets on a storage module 1400 of the server computer 1200. The server 1200 reserves a raffle ticket for a particular participant in a particular raffle by associating the raffle ID, participant ID, and secret entry data that are received in the ticket reservation request with an available ticket ID. This association may be made for example in a database stored on the storage module 1400. Alternatively, the association may be stored in a database in the memory module 1220 or in a combination of the memory module 1220 and the storage module 1400. Alternatively, some mechanism other than a database may be used to store the associated raffle ticket data. In this particular embodiment, the entry data is not decrypted before it is stored. It is stored on the storage module 1400 in its original encrypted form. The server 1200 does not need to know the content of the entry data at this stage. Alternatively, the server 1200 may decrypt the entry data at this stage and then re-encrypt it prior to storage on the storage module 1400. As another alternative, the server 1200 may decrypt the entry data and store the entry data in a non-encrypted form on the storage module 1400. Some record is made in the memory module 1220 or the storage module 1400 that the particular ticket ID in a particular raffle has been reserved and is no longer available. Standard concurrency techniques, or the use of a database that embody such techniques, may be used to ensure that the same ticket ID is not simultaneously reserved by two different participants.

The method 2000 further comprises decrypting 2030, at the server computer 1200, the entry data. As noted above, the entry data in the ticket reservation request is encrypted for communication through the network 1300. Alternatively, the entire ticket reservation request may be encrypted for communication through the network 1300. At some point in the process, the server 1200 decrypts the entry data and possibly the other data included in the ticket reservation request. In this embodiment, the entry data is stored on the storage module 1400 in its original encrypted form. In this case, the decryption stage only occurs when the second stage (the draw process to select a winner) begins. In another embodiment, the server 1200 decrypts the entry data upon receiving the ticket reservation request and prior to storing the entry data on the storage module 1400.

The first stage comprises the ticket reservation stage. This first stage can complete upon any number of conditions being satisfied. For example, the administrator may set a fixed number of raffle tickets for the raffle, such that the first stage completes once that fixed number of raffle tickets has been reserved. Alternatively, the administrator may select that the first stage lasts for a fixed number of days or completes at a particular date and time. Alternatively, the administrator may leave the first stage of the raffle open-ended such that it is left to the discretion of the administrator to terminate the first stage at any time. For example, the administrator may use a user interface of a client computer 1500 or the server 1200 to indicate at any time that the first stage of the raffle process has completed. Alternatively, any other condition which can be detected by the server 1200 may be used to determine when the first stage of the raffle has completed. Alternatively, some combination of the foregoing may be used. For example, the first stage of the raffle process may terminate after a certain amount of time has passed or a certain number of raffle tickets have been reserved, whichever occurs first. Once the first stage completes, the server 1200 may retrieve the raffle tickets from the storage module 1400 or the memory module 1220, wherein the raffle tickets comprise an association of at least the raffle ID, participant ID, secret entry data, and ticket ID. Upon retrieving the raffle tickets, the server 1200 decrypts the entry data. The decrypted entry data may then be stored in the memory module 1220 in association with the raffle ID, participant ID, and ticket ID for further processing in order to select the winner of the raffle.

The method 2000 further comprises obtaining 2040 a first output related to the raffle by computing a first deterministic mathematical function taking a first plurality of inputs, wherein the first plurality of inputs comprise the entry numbers. As noted above, the entry data stored in the storage module 1400 may already be entry numbers or they may be another form of data that can be converted to entry numbers. For example, the entry data may be a string of characters entered by the participant that can be converted to an entry number by summing the number of characters in the string or summing the ASCII or UTF-8 values of the characters in the string. As another example, the entry data may be an image, which can be converted to an entry number by counting the number of bytes in the image. If the entry data is not yet an entry number, the server computer 1200 converts the entry data for each raffle ticket to an entry number, resulting in a plurality of entry numbers, one for each raffle ticket. A deterministic mathematical function is then applied to the entry numbers. The mathematical function is deterministic in the sense that the same inputs to the function will always produce the same outputs: there is no random component to the first mathematical function. In the preferred embodiment, the first mathematical function is addition, such that the first mathematical function takes the sum of all the entry numbers. Alternatively, the first mathematical function may be subtraction, such that the first mathematical function subtracts all the entry numbers from one another as follows: $n_1-n_2-n_3-\ldots-n_N$, wherein $n_i$ is the $i^{th}$ entry number and there are a total of N entry numbers. Alternatively, the first mathematical function may add, subtract, or multiply a constant value (which is disclosed to the participants prior to the draw process) to either of the above results. The first mathematical function may also divide any of the above results by a constant value (which is disclosed to the participants prior to the draw process). Alternatively, the constant value may correspond to the number of raffle tickets reserved in the raffle. Alternatively, the number of raffle tickets may factor into the first mathematical function in some other way. Alternatively, the first mathematical function may alternate between addition and subtraction as follows: $n_1+n_2-n_3+n_4-\ldots+/-n_N$, wherein the final operation depends on whether the number of entry numbers is even or odd. Any other alternation between or combination of addition and subtraction would also be possible. The first mathematical function used may vary depending, for example. on the date and time of the draw process or the number of participants in the raffle. Any mathematical function may be used as the first mathematical function as long as it is deterministic (i.e., given the same inputs it produces the same output) and it is not possible to predict the output of the first mathematical function based on a single entry number. That is, it is not possible for a participant to manipulate the first mathematical function to produce a desired output (or increase the chances of a particular output occurring) by selecting a particular entry data regardless of the entry data of the other participants.

The method 2000 further comprises selecting 2050 a winning raffle ticket for the raffle by obtaining a second output related to the raffle by computing a second deterministic mathematical mapping function taking as a second input the first output of the first mathematical function, wherein the second output corresponds to the winning raffle ticket of the plurality of raffle tickets. Optionally, the raffle ticket IDs correspond to the natural numbers in the set $\{1, 2, 3 \ldots N\}$, where there are N raffle tickets. It will be appreciated that since the output of the first mathematical function may be any number whatsoever, said output will likely not correspond to one of the raffle ticket IDs. In order to select a winning raffle ticket using the output from the first mathematical function, said output is mapped to one of the ticket IDs in the set $\{1, 2, 3 \ldots N\}$ using a second deterministic mathematical mapping function. The second mathematical mapping function is deterministic in the sense that the same inputs will produce the same output: there is no random component to the second deterministic mathematical mapping function. The second mathematical function is a mapping function in the sense that it maps one set of numbers (e.g., the set of natural numbers, the set of whole numbers, the set of integers, or the set of real numbers) onto the set of numbers $\{1, 2, 3 \ldots N\}$ corresponding to the ticket IDs. Optionally, the output from the first mathematical function corresponds to an integer value (note that the user interface of the client computers 1500 may restrict the inputs of the participants to ensure this result) and the second deterministic mathematical mapping function is the following:

$$n = (\text{absolute\_value}(O) \text{ modulo } N) + 1$$

where O corresponds to the output of the first mathematical function, N corresponds to the number of raffle tickets, and n corresponds to the result of the second mathematical function. The absolute_value function returns the non-negative value of the integer O. The modulo function returns the remainder when absolute_value(O) is divided by N. For example, 10 modulo 5 is 0, 7 modulo 5 is 2, and 3 modulo 5 is 3. It will be appreciated that the result of absolute_value (O) modulo N is a number in the range 0 to N−1, such that adding 1 to this result produces a number in the set $\{1, 2, 3 \ldots N\}$, as desired. It will be appreciated that the above second mathematical mapping function produces an output n that is in the set $\{1, 2, 3 \ldots N\}$ and is a function of the output O of the first mathematical function. The ticket IDs need not correspond to the natural numbers in the set $\{1, 2, 3 \ldots N\}$. For example, the ticket IDs may correspond to the numbers in the set $\{0, 1, 2 \ldots N-1\}$ or $\{5, 6, 7 \ldots N+4\}$. That is, the set of ticket ID numbers may correspond to any set of numbers and the second mathematical mapping function may be appropriately adapted to produce a number in this set. Furthermore, the first mathematical function need not produce an integer as an output. The first mathematical function may produce a real number as an output. In this case, the second mathematical mapping function may be adapted to round the output O of the first mathematical function to the closest integer. The value n that is computed using the second mathematical mapping function corresponds to one of the ticket IDs such that the raffle ticket with the ticket ID equal to n is the winning raffle ticket, and the participant holding said raffle ticket is the winner of the raffle.

More generally, let f denote the second mathematical mapping function, let X denote the output domain of the first mathematical function, and let Y denote the domain of ticket ID numbers. X and Y may comprise any numbers whatsoever. The function f takes a number x from the domain X as input and outputs a number y in the domain Y. The second mathematical mapping function f may be any mathematical mapping function whatsoever as long as it has the following two properties. First, the function f is a surjective or onto function. That is. for every element y in the domain Y there is at least one element x in X such that f(x)=y. Second, the function f maps every element in X onto an element in Y. That is, f does not map any element in X to an element outside Y. Optionally, f may have the further property that the number of x's that are mapped to a given y are equal to or roughly equal to the number of x's that are mapped to any other y.

In summary. the first and second mathematical functions may be expressed as a single mathematical function:

$$n = \left( \text{absolute\_value}\left( \sum_{i=1}^{N} \text{entry\_number}_i \right) \text{modulo } N \right) + 1$$

where N corresponds to the number of raffle tickets, entry_number$_i$ corresponds to the entry number of the i$^{th}$ raffle ticket, and n corresponds to the winning raffle ticket ID.

Optionally, the method 2000 further comprises specifying a sequential ordering of the plurality of raffle tickets. As noted above, the ticket IDs of the raffle tickets may correspond to the natural numbers in the set {1, 2, 3 . . . N }, or to some other sequential ordering of numbers and/or alphanumeric characters, in which case the ticket IDs may provide the sequential ordering of the raffle tickets. Alternatively, the sequential ordering of the raffle tickets may be provided in some other manner. For example, the raffle tickets may be ordered based on the date and time they were reserved. That is the sequential ordering of the raffle tickets is the order that they were reserved. As another alternative, the sequential ordering of the raffle tickets may be based on the alphabetical ordering of the names of the participants on the raffle tickets. Optionally, the winning raffle ticket may be selected based on the sequential ordering of the raffle tickets rather than based on the ticket ID, particularly when the sequential ordering is not based on the ticket IDs or when the ticket IDs are not represented by numbers. Specifically, the winning raffle ticket may be the n$^{th}$ raffle ticket in the sequential ordering of the raffle tickets where n is the result computed using the second mathematical mapping function. In such cases, the ticket IDs need not be a set of sequentially ordered numbers.

Optionally, the method 2000 further comprises verifying the winning raffle ticket after selection of the winning raffle ticket. Once the draw process is completed, the server 1200 may provide the participants with the Raffle Verification Data, which they can use to verify the results of the raffle. The Raffle Verification Data may comprise at least the entry data or entry numbers for each of the raffle tickets, the first and second mathematical functions, and the result of the second mathematical function corresponding to the winning ticket. The participants may then use this Raffle Verification Data to re-compute the winning raffle ticket to confirm the result. Furthermore, entry data or entry numbers may be provided to the participants in association with ticket IDs so that the participants can verify that their entry data and/or entry number used in the calculation was correct. Optionally, the statements and instructions recorded on the memory module 1220 may further comprise code means for sending the entry data or the entry numbers through the computer network 1300 for display on the at least one remote client computer 1500. Once the draw process is complete, the server 1200 may send a Raffle Completed message to the client computers 1500 through the network 1300 containing the Raffle Verification Data and in particular the entry data and entry numbers for display on the client computers 1500. For example, the server 1200 may publish the entry data or entry numbers on a web page that is accessible to the participants. Alternatively, the server 1200 may send the entry data or entry numbers to the client computers 1500 or participants via email, text messaging, or some other chat or messaging protocol. Alternatively, the entry data or entry numbers may be displayed on the display device 1250 of the server 1200 to the administrator of the raffle, who then takes further steps to provide this information to the participants. If the entry data is an entry number or if the conversion from entry data to entry number can be carried out easily by the participants (e.g., counting the number of characters in a string). then only entry data needs to be provided to the participants for verification purposes. Alternatively, if it is complicated to convert the entry data to entry numbers, then both entry data and entry numbers may be provided to the participants. The entry data or the entry numbers may only be disclosed to the participants once the ticket reservation stage is complete (i.e., after all the tickets have been received). This is because a participant who submits the last raffle ticket and who knew the first and second mathematical functions and all the entry numbers already submitted would be able to select an entry number guaranteeing that he would win the raffle. The entry numbers should remain secret and confidential until after the ticket reservation stage when no more raffle tickets may be reserved.

Optionally, the method 2000 further comprises obtaining the entry data of at least one of the raffle tickets under control exerted only at the server computer 1200. wherein the entry data or the entry number obtained from said entry data is sent through the computer network 1300 for display at the at least one remote client computer 1500 before all the raffle tickets have been received. As one option, the entry data may be automatically randomly generated by the server 1200 upon receiving a request to reserve a raffle ticket or upon receiving a request to generate the entry data. The server 1200 then sends a ticket reserved confirmation through the network 1300 to the client computer 1500, wherein said confirmation includes the entry data selected by the server 1200 for display at the client computer 1500. The entry data is disclosed to the participant upon reserving the raffle ticket, or at least before all the raffle tickets have been receiving, so that the participant can verify that the administrator is not manipulating the raffle process to produce a desired result. The participant may also be given the opportunity to modify the randomly generated entry data. Alternatively, the server 1200 may convert the entry data to an entry number prior to sending the entry number to the client computer 1500.

Figure 3:
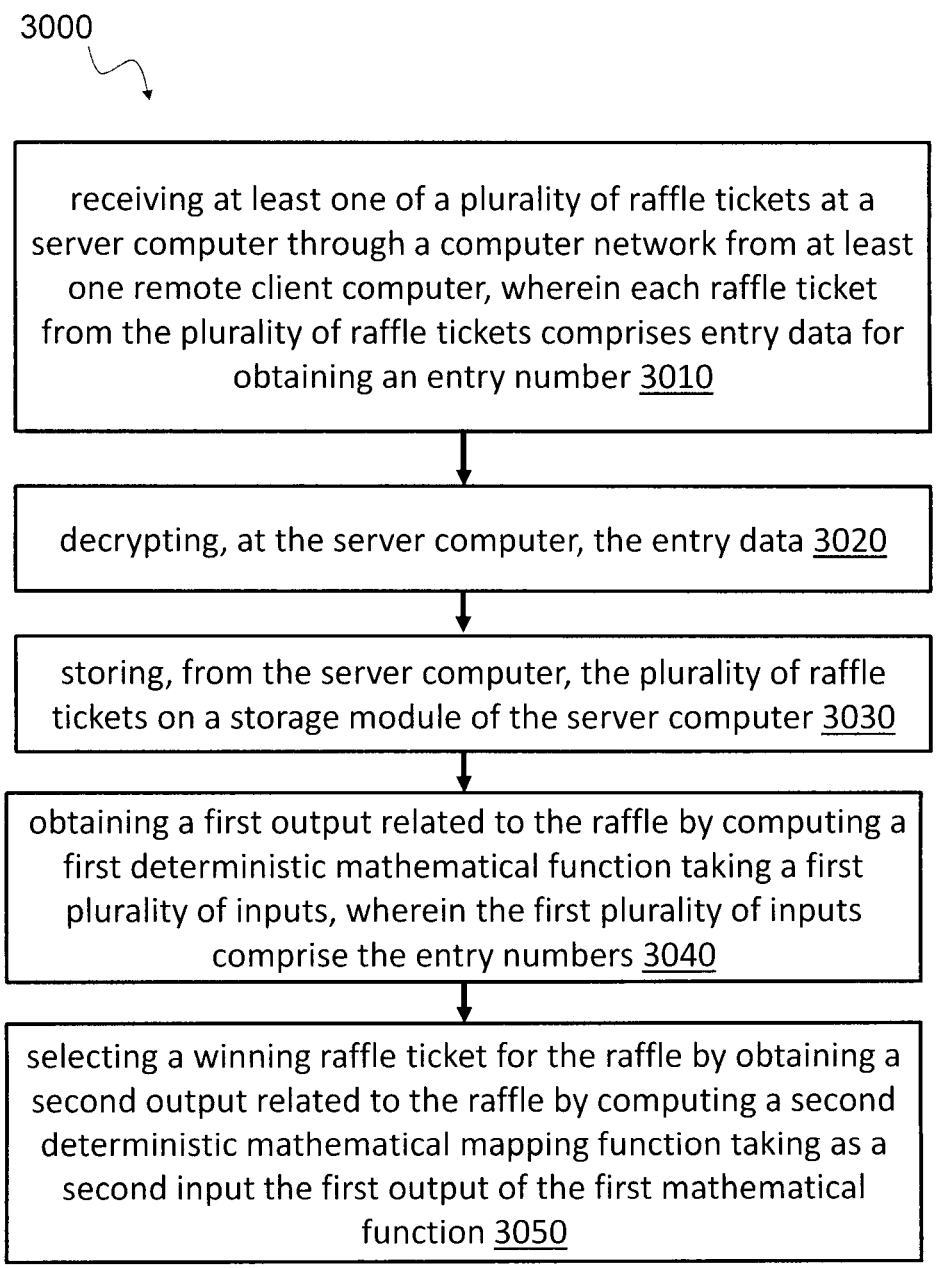
FIG. 3 is a flow chart of an exemplary method for deterministically selecting the winner of a raffle from a plurality of raffle tickets.

Reference is now made concurrently to FIG. 1 and FIG. 3, which shows a flow chart of an exemplary method 3000 for securely and deterministically selecting a winner for a raffle from a plurality of received raffle tickets taking into account selected content from the received raffle tickets. The administrator may be one or more people or a company. The administrator may create the raffle remotely at one of the remote client computing devices 1500 by sending a create raffle request from the client computer 1500 to the server 1200 through the network 1300. Alternatively, the administrator may create the raffle locally at the server computer 1200. The user interface module 1240 may provide the user interface, either locally or remotely, that enables the administrator to create and manage the raffle. In response to the request, the server 1200 may respond to the client computer 1500 with an OK message through the network 1300 and associate a unique raffle ID to the newly created raffle. In creating the raffle, the administrator may specify a fixed number of raffle tickets or may alternatively put no limit on the number of raffle tickets. At any time up until the drawing process for selecting a winner, the administrator may delete the raffle.

The method 3000 further comprises receiving 3010 at least one of the plurality of raffle tickets at a server 1200 computer through a computer network 1300 from at least one remote client computer 1500, wherein each raffle ticket from the plurality of raffle tickets comprises entry data for obtaining an entry number such that the entry data of at least one of said raffle tickets is selected under control exerted only at the remote client computer 1500 and is strongly encrypted by the client computer 1500 for communication over the computer network 1300 to the server computer 1200. The user interface module 1240 of the server 1200 may provide the remote client computers 1500 with a user interface enabling participants to enter a raffle. Alternatively, the server 1200 may provide the remote client computers 1500 with data with which the remote client computers 1500 may create the user interface. From the remote client computer 1500, the participant may send a request to the server 1200 through the network 1300 for a list of the active raffles. The server 1200 may respond to this request with the raffle IDs of the active raffles through the network 1300. The participant may request further information regarding a particular raffle ID, to which the server 1200 will respond with further information about the raffle, such as the name of the raffle, the administrator of the raffle, the date and time of the raffle, the prize associated with the raffle, the number of raffle tickets, the number of reserved raffle tickets, the ticket IDs of the reserved and/or available raffle tickets, or any policies related to the raffle (e.g., regarding ticket cancellation).

The participant may then reserve a ticket in a particular raffle. In doing so, the participant selects secret entry data that can be used to obtain a secret entry number. The entry data is selected under control exerted only at the remote client computer 1500, which means that the entry data is either entered at the remote client computer 1500 or at least that the generation of the entry data is initiated at the remote client computer and the entry data or entry number is reviewed by the participant at the remote client computer 1500. In the preferred embodiment, the participant enters a number at the remote client computer 1500, in which case the entry data is the entry number. Alternatively, the client computer 1500 may randomly select a number for the participant upon request by the participant and display the number to the participant, in which case again the entry data is the entry number. Alternatively, the server computer 1200 may randomly select a number for the participant upon request by the participant and send the number to the client computer 1500 for display to the participant, in which case again the entry number is the entry data. Alternatively, the participant enters at the client computer 1500 a string of characters as the entry data, which can be converted into the entry number, for example by counting the number of characters in the string or by summing the ASCII or UTF-8 values of each of the characters in the string. Alternatively, the participant may provide at the client computer 1500 an image as the entry data, which can be converted into the entry number by, for example, counting the bytes in the image. Alternatively, the entry data may be based on the date and/or time that the participant reserves the raffle ticket. For example, if the participant reserves a ticket at 10:10 AM, the entry data may be the number 1010. As another alternative, the entry data may be a combination of a number selected by the participant and the date and/or time that the participant reserves the raffle ticket. As previously indicated, skilled persons will understand that, in the context of the present invention, the secret data may represent any value that computers are expected to be able to manipulate in a deterministic manner (e.g., number, string of characters or symbols, etc.). If necessary, the conversion of the entry data to entry number may be carried out by the client computer 1500 or by the server 1200. In preferred embodiments where the entry data provided by the participant is not a number, the manner in which the value is converted into said number is disclosed in advance of the raffle to enhance trust in the system.

The client computer 1500 then sends a request to reserve a raffle ticket to the server 1200 through the network 1300, the request comprising a participant ID, a raffle ID and the secret entry data (which may be the entry number). In order to ensure the integrity of the raffle, the client computer 1500 strongly encrypts the request to reserve a raffle ticket, or at least strongly encrypts the secret entry data, for communication through the network 1300. The server 1200 receives this plurality of entry tickets from the plurality of client computers 1500. The server 1200 responds to each request with a ticket reserved confirmation, wherein the confirmation may include the raffle ID, the ticket ID, and the secret entry data (which may be a number). The server 1200 strongly encrypts the ticket reserved confirmation, or at least strongly encrypts the secret entry data, for communication through the network 1300. A skilled person will understand "strong encryption" to mean any encryption algorithm that is highly resistant to cryptanalysis and for which there is no known attack, such as PGP, AES, and Elyptic-curve cryptography. In one embodiment, the raffle process is implemented as a web application that uses HTTPS to encrypt the data exchanged between the server 1200 and the remote client computers 1500 through the Internet 1300. In one embodiment, the client computers 1500 and the server 1200 use a form of public-key cryptography to communicate the secret entry data back-and-forth. Other forms of encryption may also be used. Each participant may reserve more than one raffle ticket. Reserving more than one raffle ticket may comprise sending a single request or sending one request for each raffle ticket. Each raffle ticket reserved by a single participant may have the same entry data or different entry data.

Encryption is necessary to ensure the integrity of the raffle process and to ensure that participants can trust the raffle process. A participant who knew all the other entry data and the mathematical functions for selecting the winner would be able to select their own entry data to guarantee that their ticket, or another ticket, would win the raffle. It is therefore necessary to ensure the integrity of the raffle that the entry data are kept secret. To keep the entry data secret it is necessary to use encryption to protect the raffle process from well-known attacks. For example, if the entry data were not encrypted for communication through the network 1300, an attacker could observe the traffic on the network 1300 to discover all of the entry data. If the entry data were not encrypted when stored on the server 1200. an attacker could discover all the entry data in a raffle by gaining access to the server 1200. Encryption is therefore necessary to ensure the integrity of the raffle process. A skilled person will recognize that such encryption must be carried out by a computer system. A human would not be able to carry out the calculations for encrypting and decrypting the entry data fast enough to provide a raffle system with the required response times.

The method 3000 further comprises decrypting 3020, at the server computer 1200, the entry data. As noted above, the entry data in the ticket reservation request is encrypted for communication through the network 1300. Alternatively, the entire ticket reservation request may be encrypted for communication through the network 1300. At some point in the process, the server 1200 decrypts the entry data and possibly the other data included in the ticket reservation request. In this embodiment, the server 1200 decrypts the entry data upon receiving the ticket reservation request and prior to storing the entry data on the storage module 1400. The server 1200 may strongly re-encrypt the entry data prior to storing it on the storage module 1400.

The method 3000 further comprises storing 3030, from the server computer 1200, the plurality of raffle tickets on a storage module 1400 of the server computer 1200. The server 1200 reserves a raffle ticket for a particular participant in a particular raffle by associating the raffle ID, participant ID, and secret entry data that are received in the ticket reservation request with an available ticket ID. This association may be made for example in a database stored on the storage module 1400. Alternatively, the association may be stored in a database in the memory module 1220 or in a combination of the memory module 1220 and the storage module 1400. Alternatively, some mechanism other than a database may be used to store the associated raffle ticket data. In this particular embodiment, the server 1200 decrypts the entry data at this stage and then strongly re-encrypts it prior to storage on the storage module 1400. As another alternative, the server 1200 may decrypt the entry data and store the entry data in a non-encrypted form on the storage module 1400. Some record is made in the memory module 1220 or the storage module 1400 that the particular ticket ID in a particular raffle has been reserved and is no longer available. Standard concurrency techniques, or the use of a database that embody such techniques, may be used to ensure that the same ticket ID is not simultaneously reserved by two different participants.

The first stage comprises the ticket reservation stage. This first stage can complete upon any number of conditions being satisfied. For example, the administrator may set a fixed number of raffle tickets for the raffle, such that the first stage completes once that fixed number of raffle tickets has been reserved. Alternatively, the administrator may select that the first stage lasts for a fixed number of days or completes at a particular date and time. Alternatively, the administrator may leave the first stage of the raffle open-ended such that it is left to the discretion of the administrator to terminate the first stage at any time. For example, the administrator may use a user interface of a client computer 1500 or the server 1200 to indicate at any time that the first stage of the raffle process has completed. Alternatively, any other condition which can be detected by the server 1200 may be used to determine when the first stage of the raffle has completed. Alternatively, some combination of the foregoing may be used. For example, the first stage of the raffle process may terminate after a certain amount of time has passed or a certain number of raffle tickets have been reserved, whichever occurs first. Once the first stage completes, the server 1200 may retrieve the raffle tickets from the storage module 1400 or the memory module 1220. wherein the raffle tickets comprise an association of at least the raffle ID, participant ID, secret entry data, and ticket ID. Upon retrieving the raffle tickets, the server 1200 decrypts the entry data. The decrypted entry data may then be stored in the memory module 1220 in association with the raffle ID. participant ID, and ticket ID for further processing in order to select the winner of the raffle.

The method 3000 further comprises obtaining 3040 a first output related to the raffle by computing a first deterministic mathematical function taking a first plurality of inputs, wherein the first plurality of inputs comprise the entry numbers. As noted above, the entry data stored in the storage module 1400 may already be entry numbers or they may be another form of data that can be converted to entry numbers. For example, the entry data may be a string of characters entered by the participant that can be converted to an entry number by summing the number of characters in the string or summing the ASCII or UTF-8 values of the characters in the string. As another example, the entry data may be an image, which can be converted to an entry number by counting the number of bytes in the image. If the entry data is not yet an entry number, the server computer 1200 converts the entry data for each raffle ticket to an entry number, resulting in a plurality of entry numbers, one for each raffle ticket. A deterministic mathematical function is then applied to the entry numbers. The mathematical function is deterministic in the sense that the same inputs to the function will always produce the same outputs: there is no random component to the first mathematical function. In the preferred embodiment, the first mathematical function is addition, such that the first mathematical function takes the sum of all the entry numbers. Alternatively, the first mathematical function may be subtraction, such that the first mathematical function subtracts all the entry numbers from one another as follows: $n_1-n_2-n_3-\ldots-n_N$, wherein $n_i$ is the $i^{th}$ entry number and there are a total of N entry numbers. Alternatively, the first mathematical function may add, subtract, or multiply a constant value (which is disclosed to the participants prior to the draw process) to either of the above results. The first mathematical function may also divide any of the above results by a constant value (which is disclosed to the participants prior to the draw process).

Alternatively, the constant value may correspond to the number of raffle tickets reserved in the raffle. Alternatively, the number of raffle tickets may factor into the first mathematical function in some other way. Alternatively, the first mathematical function may alternate between addition and subtraction as follows: $n_1+n_2-n_3+n_4-\ldots+/-n_N$, wherein the final operation depends on whether the number of entry numbers is even or odd. Any other alternation between or combination of addition and subtraction would also be possible. The first mathematical function used may vary depending, for example, on the date and time of the draw process or the number of participants in the raffle. Any mathematical function may be used as the first mathematical function as long as it is deterministic (i.e., given the same inputs it produces the same output) and it is not possible to predict the output of the first mathematical function based on a single entry number. That is, it is not possible for a participant to manipulate the first mathematical function to produce a desired output (or increase the chances of a particular output occurring) by selecting a particular entry data regardless of the entry data of the other participants.

The method 3000 further comprises selecting 3050 a winning raffle ticket for the raffle by obtaining a second output related to the raffle by computing a second deterministic mathematical mapping function taking as a second input the first output of the first mathematical function, wherein the second output corresponds to the winning raffle ticket of the plurality of raffle tickets. Optionally, the raffle ticket IDs correspond to the natural numbers in the set {1, 2 3 . . . N}, where there are N raffle tickets. It will be appreciated that since the output of the first mathematical function may be any number whatsoever, said output will likely not correspond to one of the raffle ticket IDs. In order to select a winning raffle ticket using the output from the first mathematical function, said output is mapped to one of the ticket IDs in the set {1, 2, 3 . . . N} using a second deterministic mathematical mapping function. The second mathematical mapping function is deterministic in the sense that the same inputs will produce the same output: there is no random component to the second deterministic mathematical mapping function. The second mathematical function is a mapping function in the sense that it maps one set of numbers (e.g., the set of natural numbers, the set of whole numbers, the set of integers, or the set of real numbers) onto the set of numbers {1, 2, 3 . . . N} corresponding to the ticket IDs. Optionally, the output from the first mathematical function corresponds to an integer value (note that the user interface of the client computers 1500 may restrict the inputs of the participants to ensure this result) and the second deterministic mathematical mapping function is the following:

$$n = (\text{absolute\_value}(O) \text{ modulo } N) + 1$$

where O corresponds to the output of the first mathematical function, N corresponds to the number of raffle tickets, and n corresponds to the result of the second mathematical function. The absolute_value function returns the non-negative value of the integer O. The modulo function returns the remainder when absolute_value(O) is divided by N. For example, 10 modulo 5 is 0, 7 modulo 5 is 2, and 3 modulo 5 is 3. It will be appreciated that the result of absolute value(O) modulo N is a number in the range 0 to N−1, such that adding 1 to this result produces a number in the set {1, 2, 3 . . . N}, as desired. It will be appreciated that the above second mathematical mapping function produces an output n that is in the set {1, 2, 3 . . . N} and is a function of the output O of the first mathematical function. The ticket IDs need not correspond to the natural numbers in the set {1, 2, 3 . . . N}. For example, the ticket IDs may correspond to the numbers in the set {0, 1, 2 . . . N−1} or {5, 6, 7 . . . N+4}. That is, the set of ticket ID numbers may correspond to any set of numbers and the second mathematical mapping function may be appropriately adapted to produce a number in this set. Furthermore, the first mathematical function need not produce an integer as an output. The first mathematical function may produce a real number as an output. In this case, the second mathematical mapping function may be adapted to round the output O of the first mathematical function to the closest integer. The value n that is computed using the second mathematical mapping function corresponds to one of the ticket IDs such that the raffle ticket with the ticket ID equal to n is the winning raffle ticket, and the participant holding said raffle ticket is the winner of the raffle.

More generally, let f denote the second mathematical mapping function, let X denote the output domain of the first mathematical function, and let Y denote the domain of ticket ID numbers. X and Y may comprise any numbers whatsoever. The function f takes a number x from the domain X as input and outputs a number y in the domain Y. The second mathematical mapping function f may be any mathematical mapping function whatsoever as long as it has the following two properties. First, the function f is a surjective or onto function. That is, for every element y in the domain Y there is at least one element x in X such that f(x)=y. Second, the function f maps every element in X onto an element in Y. That is, f does not map any element in X to an element outside Y. Optionally, f may have the further property that the number of x's that are mapped to a given y are equal to or roughly equal to the number of x's that are mapped to any other y.

In summary. the first and second mathematical functions may be expressed as a single mathematical function:

$$n = \left(\text{absolute\_value}\left(\sum_{i=1}^{N} \text{entry\_number}_i\right) \text{ modulo } N\right) + 1$$

where N corresponds to the number of raffle tickets, entry_number$_i$ corresponds to the entry number of the raffle ticket, and n corresponds to the winning raffle ticket ID.

Reference is now made to FIG. 1, which shows a dedicated computer 1200 for securely and deterministically selecting a winner for a raffle from a plurality of raffle tickets taking into account selected content from the received raffle tickets. The computer 1200 comprises a memory module 1220, a processor module 1230, a user interface module 1240, a network interface module 1210, and a storage module 1400. The storage module 1400 may be a standard hard disk drive, a solid state drive, a tape drive, RAID storage, or any form of non-volatile memory that meets the various requirements for storing and retrieving the plurality of raffle tickets and other information related to the raffle. The storage module 1400B may be externally connected to the server 1200. The storage module 1400 may be a remote network storage connected to the server 1200 via the network 1300 (not shown). Alternatively, the storage module 1400A may be integrated with the server 1200. The server 1200 may further comprise a display device 1250, which may be a remote display device connected to the server 1200 through the network 1300 (not shown), a display device directly connected to the server 1200 (not shown), or an integrated display device 1250.

According to this embodiment of the present invention, participants and the administrator interact directly with the computer 1200 instead of interacting remotely via client computing devices through the network 1300. This embodiment of the invention may for example be used in the context of a casino or a bar where participants enter the raffle by using a user interface on a display device 1250 of the computer 1200. A raffle is initially created by an administrator of the raffle. The administrator may be one or more people or a company. The administrator may create the raffle locally at the server computer 1200 through the display device 1250. The user interface module 1240 may provide the user interface that enables the administrator to create and manage the raffle. In creating the raffle, the administrator may specify a fixed number of raffle tickets or may alternatively put no limit on the number of raffle tickets. At any time up until the drawing process for selecting a winner, the administrator may delete the raffle.

The dedicated computer 1200 further comprises at least one input module (not shown) for receiving entry data for obtaining an entry number for each of a plurality of raffle tickets. The user interface module 1240 of the computer 1200 may provide the participants with a user interface enabling participants to enter a raffle. Through the user interface, the participant may view a list of the active raffles. The participant may further view information regarding a particular raffle, such as the name of the raffle, the administrator of the raffle, the date and time of the raffle, or the prize associated with the raffle. The input module may be a keyboard. a mouse, a touchscreen, or any combination thereof. The participant may then reserve a ticket in a particular raffle. In doing so, the participant selects secret entry data that can be used to obtain a secret entry number. In the preferred embodiment, the participant enters a number at the computer 1200, in which case the entry data is the entry number. Alternatively, the computer 1200 may randomly select a number for the participant upon request by the participant and display the number to the participant, in which case again the entry data is the entry number. Alternatively, the participant enters at the computer 1200 a string of characters as the entry data, which can be converted into the entry number, for example by counting the number of characters in the string or by summing the ASCII or UTF-8 values of each of the characters in the string. Alternatively, the participant may provide at the computer 1200 an image as the entry data, which can be converted into the entry number by, for example, counting the bytes in the image. Alternatively, the entry data may be based on the date and/or time that the participant reserves the raffle ticket. For example, if the participant reserves a ticket at 10:10 AM, the entry data may be the number 1010. As another alternative, the entry data may be a combination of a number selected by the participant and the date and/or time that the participant reserves the raffle ticket. As previously indicated, skilled persons will understand that, in the context of the present invention, the secret data may represent any value that computers are expected to be able to manipulate in a deterministic manner (e.g., number, string of characters or symbols, etc.). If necessary. the conversion of the entry data to entry number may be carried out by the computer 1200. The dedicated computer 1200 may comprise more than input module and/or display device 1250 enabling multiple participants to enter the raffle simultaneously. Upon reserving one or more raffle tickets, the dedicated computer 1200 may print a physical raffle ticket for the participant comprising the ticket ID and the entry data or entry number.

The dedicated computer 1200 further comprises an encrypted storage module 1400 for securely storing the raffle tickets. The dedicated computer 1200 reserves a raffle ticket for a particular participant in a particular raffle by associating the raffle ID, participant ID, and secret entry data with an available ticket ID. This association may be made for example in a database stored on the storage module 1400. Alternatively, the association may be stored in a database in the memory module 1220 or in a combination of the memory module 1220 and the storage module 1400. Alternatively, some mechanism other than a database may be used to store the associated raffle ticket data. Some record is made in the memory module 1220 or the storage module 1400 that the particular ticket ID in a particular raffle has been reserved and is no longer available. Standard concurrency techniques, or the use of a database that embody such techniques, may be used to ensure that the same ticket ID is not simultaneously reserved by two different participants. if the computer 1200 has multiple display devices and/or input modules. The storage module 1400 of the server computer 1200 may be a strongly encrypted storage module, such that when the entry data or entry number is stored on the storage module 1400 as part of the raffle ticket it is automatically encrypted. A skilled person will understand "strong encryption" to mean any encryption algorithm that is highly resistant to cryptanalysis and for which there is no known attack, such as PGP, AES, and Elyptic-curve cryptography. Other forms of encryption may also be used. The integrity of the raffle process depends on the confidentiality of the entry data and entry numbers. If a participant were able to discover the entry numbers of the other participants, said participant would potentially be able to manipulate the raffle process and guarantee that he would win by selecting an appropriate entry number. To protect against this, the entry data may be stored securely in encrypted form.

The first stage comprises the ticket reservation stage. This first stage can complete upon any number of conditions being satisfied. For example, the administrator may set a fixed number of raffle tickets for the raffle, such that the first stage completes once that fixed number of raffle tickets has been reserved. Alternatively, the administrator may select that the first stage lasts for a fixed number of days or completes at a particular date and time. Alternatively, the administrator may leave the first stage of the raffle open-ended such that it is left to the discretion of the administrator to terminate the first stage at any time. For example, the administrator may use a user interface of a dedicated computer 1200 to indicate at any time that the first stage of the raffle process has completed. Alternatively, any other condition which can be detected by the computer 1200 may be used to determine when the first stage of the raffle has completed. Alternatively, some combination of the foregoing may be used. For example, the first stage of the raffle process may terminate after a certain amount of time has passed or a certain number of raffle tickets have been reserved, whichever occurs first. Once the first stage completes, the computer 1200 may retrieve the raffle tickets from the storage module 1400 or the memory module 1220, wherein the raffle tickets comprise an association of at least the raffle ID, participant ID, secret entry data, and ticket ID. Upon retrieving the raffle tickets, the server 1200 decrypts the entry data. The decrypted entry data may then be stored in the memory module 1220 in association with the raffle ID, participant ID, and ticket ID for further processing in order to select the winner of the raffle.

The dedicated computer 1200 wherein the processor module 1230 is further for obtaining a first output related to the raffle by computing a first deterministic mathematical function taking a first plurality of inputs, wherein the first plurality of inputs comprise the entry numbers. As noted above, the entry data stored in the storage module 1400 may already be entry numbers or they may be another form of data that can be converted to entry numbers. For example, the entry data may be a string of characters entered by the participant that can be converted to an entry number by summing the number of characters in the string or summing the ASCII or UTF-8 values of the characters in the string. As another example, the entry data may be an image, which can be converted to an entry number by counting the number of bytes in the image. If the entry data is not yet an entry number, the server computer 1200 converts the entry data for each raffle ticket to an entry number, resulting in a plurality of entry numbers, one for each raffle ticket. A deterministic mathematical function is then applied to the entry numbers. The mathematical function is deterministic in the sense that the same inputs to the function will always produce the same outputs: there is no random component to the first mathematical function. In the preferred embodiment, the first mathematical function is addition, such that the first mathematical function takes the sum of all the entry numbers. Alternatively, the first mathematical function may be subtraction. such that the first mathematical function subtracts all the entry numbers from one another as follows: $n_1-n_2-n_3-\ldots-n_N$, wherein $n_i$ is the $i^{th}$ entry number and there are a total of N entry numbers. Alternatively, the first mathematical function may add, subtract, or multiply a constant value (which is disclosed to the participants prior to the draw process) to either of the above results. The first mathematical function may also divide any of the above results by a constant value (which is disclosed to the participants prior to the draw process). Alternatively. the constant value may correspond to the number of raffle tickets reserved in the raffle. Alternatively, the number of raffle tickets may factor into the first mathematical function in some other way. Alternatively, the first mathematical function may alternate between addition and subtraction as follows: $n_1+n_2-n_3+n_4-\ldots+/-n_N$, wherein the final operation depends on whether the number of entry numbers is even or odd. Any other alternation between or combination of addition and subtraction would also be possible. The first mathematical function used may vary depending, for example, on the date and time of the draw process or the number of participants in the raffle. Any mathematical function may be used as the first mathematical function as long as it is deterministic (i.e., given the same inputs it produces the same output) and it is not possible to predict the output of the first mathematical function based on a single entry number. That is, it is not possible for a participant to manipulate the first mathematical function to produce a desired output (or increase the chances of a particular output occurring) by selecting a particular entry data regardless of the entry data of the other participants.

The dedicated computer 1200 wherein the processor module 1230 is further for selecting a winning raffle ticket for the raffle by obtaining a second output related to the raffle by computing a second deterministic mathematical mapping function taking as a second input the first output of the first mathematical function, wherein the second output corresponds to the winning raffle ticket of the plurality of raffle tickets. Optionally, the raffle ticket IDs correspond to the natural numbers in the set {1, 2, 3 ... N}, where there are N raffle tickets. It will be appreciated that since the output of the first mathematical function may be any number whatsoever, said output will likely not correspond to one of the raffle ticket IDs. In order to select a winning raffle ticket using the output from the first mathematical function, said output is mapped to one of the ticket IDs in the set {1, 2, 3 ... N} using a second deterministic mathematical mapping function. The second mathematical mapping function is deterministic in the sense that the same inputs will produce the same output: there is no random component to the second deterministic mathematical mapping function. The second mathematical function is a mapping function in the sense that it maps one set of numbers (e.g., the set of natural numbers, the set of whole numbers, the set of integers, or the set of real numbers) onto the set of numbers {1, 2, 3 ... N} corresponding to the ticket IDs. Optionally, the output from the first mathematical function corresponds to an integer value (note that the user interface of the dedicated computer 1200 may restrict the inputs of the participants to ensure this result) and the second deterministic mathematical mapping function is the following:

$$n = (\text{absolute\_value}(O) \text{ modulo } N) + 1$$

where O corresponds to the output of the first mathematical function, N corresponds to the number of raffle tickets, and n corresponds to the result of the second mathematical function. The absolute_value function returns the non-negative value of the integer O. The modulo function returns the remainder when absolute_value(O) is divided by N. For example, 10 modulo 5 is 0, 7 modulo 5 is 2, and 3 modulo 5 is 3. It will be appreciated that the result of absolute_value (O) modulo N is a number in the range 0 to N−1, such that adding 1 to this result produces a number in the set {1, 2, 3 ... N }, as desired. It will be appreciated that the above second mathematical mapping function produces an output n that is in the set {1, 2, 3 ... N } and is a function of the output O of the first mathematical function. The ticket IDs need not correspond to the natural numbers in the set {1, 2, 3 ... N}. For example, the ticket IDs may correspond to the numbers in the set {0, 1, 2 ... N−1} or {5, 6, 7 ... N+4}. That is, the set of ticket ID numbers may correspond to any set of numbers and the second mathematical mapping function may be appropriately adapted to produce a number in this set. Furthermore, the first mathematical function need not produce an integer as an output. The first mathematical function may produce a real number as an output. In this case, the second mathematical mapping function may be adapted to round the output O of the first mathematical function to the closest integer. The value n that is computed using the second mathematical mapping function corresponds to one of the ticket IDs such that the raffle ticket with the ticket ID equal to n is the winning raffle ticket, and the participant holding said raffle ticket is the winner of the raffle.

More generally, let f denote the second mathematical mapping function, let X denote the output domain of the first mathematical function, and let Y denote the domain of ticket ID numbers. X and Y may comprise any numbers whatsoever. The function f takes a number x from the domain X as input and outputs a number y in the domain Y. The second mathematical mapping function f may be any mathematical mapping function whatsoever as long as it has the following two properties. First, the function f is a surjective or onto function. That is, for every element y in the domain Y there is at least one element x in X such that f(x)=y. Second, the function f maps every element in X onto an element in Y. That is, f does not map any element in X to an element outside Y. Optionally, f may have the further property that the number of x's that are mapped to a given y are equal to or roughly equal to the number of x's that are mapped to any other y.

In summary, the first and second mathematical functions may be expressed as a single mathematical function:

$$n = \left(\text{absolute\_value}\left(\sum_{i=1}^{N} \text{entry\_number}_i\right) \text{ modulo } N\right) + 1$$

where N corresponds to the number of raffle tickets, entry_number$_i$ corresponds to the entry number of the $i^{th}$ raffle ticket, and n corresponds to the winning raffle ticket ID.

The dedicated computer 1200 wherein the display device 1250 is further for displaying the winning raffle ticket, the first deterministic mathematical function and the second deterministic mathematical function, and the entry data or the entry numbers. Once the draw process is completed, the server 1200 may provide the participants with the Raffle Verification Data, which they can use to verify the results of the raffle. The Raffle Verification Data may comprise at least the entry data or entry numbers for each of the raffle tickets, the first and second mathematical functions, and the result of the second mathematical function corresponding to the winning ticket. The participants may then use this Raffle Verification Data to re-compute the winning raffle ticket to confirm the result. Furthermore, entry data or entry numbers may be provided to the participants in association with ticket IDs so that the participants can verify that their entry data and/or entry number used in the calculation was correct. Once the draw process is complete. the dedicated computer 1200 may display the Raffle Verification Data on the display device 1250 of the dedicated computer 1200. where the participants can review and confirm the Raffle Verification Data. Alternatively, the dedicated computer 1200 may provide a printout containing the Raffle Verification Data to the participants. Alternatively, the dedicated computer 1200 may publish the entry data or entry numbers on a web page that is accessible to the participants. Alternatively, the server 1200 may send the entry data or entry numbers to the participants via email, text messaging, or some other chat or messaging protocol. If the entry data is an entry number or if the conversion from entry data to entry number can be carried out easily by the participants (e.g., counting the number of characters in a string), then only entry data needs to be provided to the participants for verification purposes. Alternatively, if it is complicated to convert the entry data to entry numbers, then both entry data and entry numbers may be provided to the participants. The entry data or the entry numbers may only be disclosed to the participants once the ticket reservation stage is complete (i.e., after all the tickets have been received). This is because a participant who submits the last raffle ticket and who knew the first and second mathematical functions and all the entry numbers already submitted would be able to select an entry number guaranteeing that he would win the raffle. The entry numbers should remain secret and confidential until after the ticket reservation stage when no more raffle tickets may be reserved.

Another embodiment of the present invention is directed to a method for securely and deterministically selecting a winner for a raffle from a plurality of received raffle tickets taking into account selected content from the received raffle tickets. This embodiment is similar to the other embodiments already described, except that the entry data are not converted to entry numbers. The first output is computed directly from the combined entry data. The method comprises receiving at least one of the plurality of raffle tickets at a server 1200 computer through a computer network 1300 from at least one remote client computer 1500, wherein each raffle ticket from the plurality of raffle tickets comprises entry data such that the entry data of at least one of said raffle tickets is selected under control exerted only at the remote client computer 1500 and is strongly encrypted by the client computer 1500 for communication over the computer network 1300 to the server computer 1200. The entry data is selected under control exerted only at the remote client computer 1500, which means that the entry data is either entered at the remote client computer 1500 or at least that the generation of the entry data is initiated at the remote client computer and the entry data is reviewed by the participant at the remote client computer 1500. The method further comprises storing, from the server computer 1200, the plurality of raffle tickets on a storage module 1400 of the server computer 1200. The method further comprises decrypting, at the server computer 1200, the entry data. The method may comprise combining the entry data from each of the raffle tickets. For example, the entry data may be strings, and combining the entry data may comprise creating a text file containing the entry data strings in the order in which they were received. The method comprises deterministically computing a first output related to the raffle from the combined entry data, where the output is a number. For example, deterministically computing the first output may comprise using a hash function to compute a hash value, where the hash value is a number and the input to the hash function is the combined entry data, such as a text file. The method further comprises selecting a winning raffle ticket for the raffle by obtaining a second output related to the raffle by computing a deterministic mathematical mapping function taking as an input the first output, wherein the second output corresponds to the winning raffle ticket of the plurality of raffle tickets.

The processor module 1230 may represent a single processor with one or more processor cores or an array of processors, each comprising one or more processor cores. The memory module 1220 may comprise various types of memory (different standardized or kinds of Random Access Memory (RAM) modules, memory cards, Read-Only Memory (ROM) modules, programmable ROM, etc.). The storage devices module 1400 may represent one or more logical or physical as well as local or remote hard disk drive (HDD) (or an array thereof). The storage devices module 1400 may further represent a local or remote database made accessible to the network node 1200 by a standardized or proprietary interface. The network interface module 1210 represents at least one physical interface that can be used to communicate with other network nodes. The network interface module 1210 may be made visible to the other modules of the network node 1200 through one or more logical interfaces. The actual stacks of protocols used by the physical network interface(s) and/or logical network interface(s) of the network interface module 1210 do not affect the teachings of the present invention. The variants of processor module 1230, memory module 1220, network interface module 1210 and storage devices module 1400 usable in the context of the present invention will be readily apparent to persons skilled in the art. Likewise. even though explicit mentions of the memory module 1220 and/or the processor module 1230 are not made throughout the description of the present examples, persons skilled in the art will readily recognize that such modules are used in conjunction with other modules of the network node 1200 to perform routine as well as innovative steps related to the present invention.

Various network links may be implicitly or explicitly used in the context of the present invention. While a link may be depicted as a wireless link, it could also be embodied as a wired link using a coaxial cable, an optical fiber, a category 5 cable, and the like. A wired or wireless access point (not shown) may be present on the link between. Likewise, any number of routers (not shown) may be present and part of the link, which may further pass through the Internet.

The present invention is not affected by the way the different modules exchange information between them. For instance, the memory module and the processor module could be connected by a parallel bus, but could also be connected by a serial connection or involve an intermediate module (not shown) without affecting the teachings of the present invention.

A method is generally conceived to be a self-consistent sequence of steps leading to a desired result. These steps require physical manipulations of physical quantities. Usually, though not necessarily, these quantities take the form of electrical or magnetic/electromagnetic signals capable of being stored, transferred, combined, compared, and otherwise manipulated. It is convenient at times, principally for reasons of common usage, to refer to these signals as bits, values, parameters, items, elements, objects, symbols, characters, terms, numbers, or the like. It should be noted, however, that all of these terms and similar terms are to be associated with the appropriate physical quantities and are merely convenient labels applied to these quantities. The description of the present invention has been presented for purposes of illustration but is not intended to be exhaustive or limited to the disclosed embodiments. Many modifications and variations will be apparent to those of ordinary skill in the art. The embodiments were chosen to explain the principles of the invention and its practical applications and to enable others of ordinary skill in the art to understand the invention in order to implement various embodiments with various modifications as might be suited to other contemplated uses.

What is claimed is:

1. A non-transitory computer readable memory having recorded thereon statements and instructions for execution by a server computer for securely and deterministically selecting a winner for a raffle from a plurality of raffle tickets taking into account selected content from the plurality of raffle tickets, said statements and instructions comprising:
    code for receiving the plurality of raffle tickets at the server computer through a computer network from at least one remote client computer, wherein each raffle ticket from the plurality of raffle tickets comprises entry data for obtaining an entry number such that the entry data of at least one of said plurality of raffle tickets is selected under control exerted only at the at least one remote client computer and is strongly encrypted by the at least one remote client computer for communication over the computer network to the server computer;
    code for storing, by the server computer, the plurality of raffle tickets on a non-volatile memory of the server computer;
    code for decrypting, at the server computer, the entry data;
    code for obtaining a first output related to the raffle by computing a first deterministic mathematical function taking a first plurality of inputs, wherein the first plurality of inputs comprise the entry numbers;
    code for selecting a winning raffle ticket for the raffle by obtaining a second output related to the raffle by computing a second deterministic mathematical mapping function taking as a second input the first output of the first deterministic mathematical function, wherein the second output corresponds to the winning raffle ticket of the plurality of raffle tickets.

2. The computer readable memory of claim 1, further comprising code for specifying a sequential ordering of the plurality of raffle tickets.

3. The computer readable memory of claim 2, wherein the second deterministic mathematical mapping function is n=(absolute_value(O) modulo N)+1, wherein n is the second output of the second deterministic mathematical mapping function, wherein O is the first output of the first deterministic mathematical function, wherein N is a number of the plurality of raffle tickets received, and wherein the winning raffle ticket is an $n^{th}$ raffle ticket in the sequential ordering of the plurality of raffle tickets.

4. The computer readable memory of claim 1, further comprising code for publicly disclosing the first deterministic mathematical function and the second deterministic mathematical mapping function before all the plurality of raffle tickets have been received.

5. The computer readable memory of claim 1, further comprising code for publicly disclosing an encrypted file containing the first deterministic mathematical function and the second deterministic mathematical mapping function before all the plurality of raffle tickets have been received and publicly disclosing a key for decrypting the encrypted file after selecting the winning raffle ticket.

6. The computer readable memory of claim 1, further comprising code for displaying on a computer monitor the winning raffle ticket.

7. The computer readable memory of claim 1, further comprising code for displaying on a computer monitor the entry data or the entry numbers of the plurality of raffle tickets after selection of the winning raffle ticket.

8. The computer readable memory of claim 1, wherein the first deterministic mathematical function is addition, subtraction, or any combination thereof.

9. The computer readable memory of claim 1, wherein the entry data are received through a user interface of the at least one remote client computer.

10. The computer readable memory of claim 1, further comprising code to randomly generate the entry data at the at least one remote client computer, wherein the entry data are displayed at the at least one remote client computer before all the plurality of raffle tickets have been received.

11. The computer readable memory of claim 1, wherein the plurality of raffle tickets stored on the non-volatile memory of the server computer comprise the entry data, and wherein the entry data are strongly encrypted.

12. The computer readable memory of claim 1, wherein the non-volatile memory of the server computer is a strongly encrypted non-volatile memory.

13. The computer readable memory of claim 1, further comprising code for verifying the winning raffle ticket after selection of the winning raffle ticket.

14. The computer readable memory of claim 13, wherein the code for verifying the winning raffle ticket comprises code for sending the entry data or the entry numbers through the computer network for display on the at least one remote client computer.

15. The computer readable memory of claim 1, further comprising code for selecting the first deterministic mathematical function from a set of mathematical functions based on a time of day.

16. The computer readable memory of claim 1, wherein the first plurality of inputs further comprises a number that is publicly disclosed before all the plurality of raffle tickets have been received.

17. The computer readable memory of claim 1, wherein the first plurality of inputs further comprises a number selected based on a time of day or a property of the plurality of raffle tickets, wherein the manner for determining the number is disclosed before all the plurality of raffle tickets have been received.

18. The computer readable memory of claim 1, wherein a subset of the plurality of raffle tickets are associated with a user and the entry data of each of the subset of the plurality of raffle tickets is the same.

19. The computer readable memory of claim 1, wherein the entry data of each raffle ticket from the plurality of raffle tickets is the entry number of each said raffle ticket.

20. The computer readable memory of claim 1, wherein the entry data of each raffle ticket from the plurality of raffle tickets is a string of characters, and wherein the entry number of each raffle ticket from the plurality of raffle tickets is a length of each said string of characters.

21. The computer readable memory of claim 1, wherein the entry number is obtained from the entry data at the server computer.

22. The computer readable memory of claim 1, wherein the entry number is obtained from the entry data at the at least one remote client computer.

23. The computer readable memory of claim 1, wherein the entry data of at least one of the plurality of raffle tickets is selected under control exerted only at the server computer, and wherein the entry data or the entry number obtained from said entry data is sent through the computer network for display at the at least one remote client computer before all the plurality of raffle tickets have been received.

24. A system for securely and deterministically selecting a winner for a raffle from a plurality of raffle tickets taking into account selected content from the plurality of raffle tickets, the system comprising:
    a server computer; and
    a plurality of remote client computers, connected through a computer network to the server computer, wherein each of the plurality of remote client computers comprises a network interface module and a processor module that:
        obtains entry data under control exerted only at one or more of the plurality of remote client computers, wherein the entry data is for obtaining an entry number;
        sends at least one raffle ticket comprising the entry data, wherein the entry data are strongly encrypted thereat for communication over the computer network towards the server computer by the network interface module;
    wherein the server computer comprises a non-volatile memory, a network interface module and a processor module that:
        receives the plurality of raffle tickets through the network interface;
        stores the plurality of raffle tickets on the non-volatile memory of the server computer;
        decrypts the entry data for each of the plurality of raffle tickets;
        obtains a first output related to the raffle by computing a first deterministic mathematical function taking a first plurality of inputs, wherein the first plurality of inputs comprise the entry numbers;
        selects a winning raffle ticket for the raffle by obtaining a second output related to the raffle by computing a second deterministic mathematical mapping function taking as a second input the first output of the first deterministic mathematical function, wherein the second output corresponds to the winning raffle ticket of the plurality of raffle tickets.

25. The system of claim 24, wherein the processor module of the server computer further specifies a sequential ordering of the plurality of raffle tickets.

26. The system of claim 25, wherein the second deterministic mathematical mapping function is n=(absolute_value(O) modulo N)+1, wherein n is the second output of the second deterministic mathematical mapping function, wherein O is the first output of the first deterministic mathematical function, wherein N is a number of the plurality of raffle tickets received, and wherein the winning raffle ticket is an $n^{th}$ raffle ticket in the sequential ordering of the plurality of raffle tickets.

27. The system of claim 24, wherein the plurality of remote client computers further comprise a user interface module for obtaining the entry data.

28. The system of claim 24, wherein the processor modules of the plurality of remote client computers further randomly generate the entry data, and wherein the entry data are displayed at the plurality of remote client computers before all the plurality of raffle tickets have been received.

29. The system of claim 24, wherein the plurality of raffle tickets stored on the non-volatile memory of the server computer comprise the entry data. and wherein the entry data are strongly encrypted.

30. The system of claim 24, wherein the non-volatile memory of the server computer is a strongly encrypted non-volatile memory.

31. The system of claim 24, wherein the processor module of the server computer further sends the entry data or entry numbers through the network interface for display on at least one of the plurality of remote client computers for the purpose of verifying the winning raffle ticket.

32. The system of claim 24, wherein the entry data of each raffle ticket from the plurality of raffle tickets is the entry number of each said raffle ticket.

33. The system of claim 24, wherein the entry data of each raffle ticket from the plurality of raffle tickets is a string of characters. and wherein the entry number of each raffle ticket from the plurality of raffle tickets is a length of each said string of characters.

34. The system of claim 24, where the processor module of the server computer further obtains the entry number from the entry data.

35. The system of claim 24, wherein the processor modules of the plurality of remote client computers further obtains the entry number from the entry data.

36. The system of claim 24, wherein the server computer and the plurality of remote client computers comprise an encryption processor.

37. The system of claim 24. wherein the server computer is further for obtaining the entry data of at least one of the plurality of raffle tickets under control exerted only at the server computer, and wherein the entry data or the entry number obtained from said entry data is sent through the computer network for display at at least one of the plurality of remote client computers before all the plurality of raffle tickets have been received.

38. A method for securely and deterministically selecting a winner for a raffle from a plurality of raffle tickets taking into account selected content from the plurality of raffle tickets, the method comprising:
    receiving at least one of the plurality of raffle tickets at a server computer through a computer network from at least one remote client computer, wherein each raffle ticket from the plurality of raffle tickets comprises entry data for obtaining an entry number such that the entry data of at least one of said plurality of raffle tickets is selected under control exerted only at the at least one remote client computer and is strongly encrypted by the at least one remote client computer for communication over the computer network to the server computer;
    storing, ny the server computer, the plurality of raffle tickets on a non-volatile memory of the server computer;
    decrypting, at the server computer, the entry data;
    obtaining a first output related to the raffle by computing a first deterministic mathematical function taking a first plurality of inputs, wherein the first plurality of inputs comprise the entry numbers;

selecting a winning raffle ticket for the raffle by obtaining a second output related to the raffle by computing a second deterministic mathematical mapping function taking as a second input the first output of the first deterministic mathematical function, wherein the second output corresponds to the winning raffle ticket of the plurality of raffle tickets.

39. The method of claim 38, further comprising specifying a sequential ordering of the plurality of raffle tickets.

40. The method of claim 39, wherein the second deterministic mathematical mapping function is n=(absolute_value(O) modulo N)+1, wherein n is the second output of the second deterministic mathematical mapping function, wherein O is the first output of the first deterministic mathematical function, wherein N is a number of the plurality of raffle tickets received, and wherein the winning raffle ticket is an $n^{th}$ raffle ticket in the sequential ordering of the plurality of raffle tickets.

41. The method of claim 38, further comprising verifying the winning raffle ticket after selection of the winning raffle ticket.

42. The method of claim 41, wherein verifying the winning raffle ticket comprises sending the entry data or the entry numbers through the computer network for display on the at least one remote client computer.

43. The method of claim 38, further comprising decrypting, at the server computer, the entry data prior to storing the plurality of raffle tickets on a non-volatile memory of the server computer.

44. The method of claim 43, further comprising strongly encrypting, at the server computer, the entry data after decrypting the entry data and prior to storing the plurality of raffle tickets on a non-volatile memory of the server computer.

45. The method of claim 38, further comprising obtaining the entry data of at least one of the plurality of raffle tickets under control exerted only at the server computer, wherein the entry data or the entry number obtained from said entry data is sent through the computer network for display at the at least one remote client computer before all the plurality of raffle tickets have been received.

46. A dedicated computer for securely and deterministically selecting a winner for a raffle from a plurality of raffle tickets taking into account selected content from the plurality of raffle tickets, the dedicated computer comprising:
　at least one input for receiving entry data for obtaining an entry number for each of a plurality of raffle tickets;
　an encrypted non-volatile memory for securely storing the plurality of raffle tickets;
　a processor module for:
　　obtaining a first output related to the raffle by computing a first deterministic mathematical function taking a first plurality of inputs, wherein the first plurality of inputs comprise the entry numbers;
　　selecting a winning raffle ticket for the raffle by obtaining a second output related to the raffle by computing a second deterministic mathematical mapping function taking as a second input the first output of the first deterministic mathematical function, wherein the second output corresponds to the winning raffle ticket of the plurality of raffle tickets;
　a display for:
　　displaying the winning raffle ticket;
　　displaying the first deterministic mathematical function and the second deterministic mathematical mapping function; and
　　displaying the entry data or the entry numbers.

\* \* \* \* \*